(12) United States Patent
Blaum et al.

(10) Patent No.: US 10,740,183 B1
(45) Date of Patent: Aug. 11, 2020

(54) RECOVERING FAILED DEVICES IN DISTRIBUTED DATA CENTERS

(71) Applicant: International Business Machines Corporation, Armonk, NY (US)

(72) Inventors: Mario Blaum, San Jose, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/371,933

(22) Filed: Apr. 1, 2019

(51) Int. Cl.
*G06F 11/10* (2006.01)

(52) U.S. Cl.
CPC ...... *G06F 11/1088* (2013.01); *G06F 11/1004* (2013.01)

(58) Field of Classification Search
CPC .................................................. G06F 11/1088
USPC .................................. 714/764, 768, 767, 772
See application file for complete search history.

(56) References Cited

U.S. PATENT DOCUMENTS

| | | |
|---|---|---|
| 7,904,782 B2 | 3/2011 | Huang et al. |
| 10,019,192 B2 | 7/2018 | Bakre et al. |
| 10,025,512 B2 | 7/2018 | Wang et al. |
| 2014/0082749 A1* | 3/2014 | Holland ............. G06F 21/645 726/29 |
| 2016/0254826 A1 | 9/2016 | David et al. |
| 2016/0380650 A1 | 12/2016 | Calder et al. |
| 2018/0309823 A1* | 10/2018 | Moshenberg ....... H04L 67/1012 |
| 2018/0351851 A1* | 12/2018 | Parthasarathy ......... H04L 45/20 |

FOREIGN PATENT DOCUMENTS

WO   2013078342 A1   5/2013

OTHER PUBLICATIONS

Rashmi et al., "A 'Hitchhiker's' Guide to Fast and Efficient Data Reconstruction in Erasure-coded Data Centers," SIGCOMM'14, Aug. 17-22, 2014, pp. 1-12.
Hou et al., "A Unified Form of EVENODD and RDP Codes and Their Efficient Decoding," arXiv draft, IEEE Transactions on Communications, Mar. 12, 2018, pp. 1-30, retrieved from https://arxiv.org/pdf/1803.03508.pdf.
Hou et al., "BASIC Codes: Low-Complexity Regenerating for Distributed Storage Systems," IEEE Transactions on Information Theory, vol. 62, No. 6, Jun. 2016, pp. 3053-3069.
Blaum et al., U.S. Appl. No. 16/262,599, filed Jan. 30, 2019.

(Continued)

*Primary Examiner* — Fritz Alphonse
(74) *Attorney, Agent, or Firm* — Zilka-Kotab, P.C.

(57) ABSTRACT

A computer-implemented method enables reconstructing contents of blocks in a storage system having l availability zones (AZs), a set of n storage units in each AZ arranged as columns, and a set of m storage blocks in each storage unit. The storage blocks of n+1 of the storage units are parity blocks, where l−1 of the AZs each include an additional parity block. The method includes using the parity blocks and/or data in the AZs and reconstructing contents of blocks in the storage system having l availability zones (AZs) from a concurrent loss of: one of the AZs, a storage unit together with one storage block in one of the remaining l−1 AZs, and one further storage block in each of the remaining l−2 AZs of the storage system.

20 Claims, 13 Drawing Sheets

(56) References Cited

OTHER PUBLICATIONS

Hately, A., "IBM Cloud announces network expansion with availability zones in six global regions," IBM, Jun. 10, 2018, 7 pages, retrieved from https://www.ibm.com/blogs/bluemix/2018/06/expansion-availability-zones-global-regions/.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Dec. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Blaum et al., U.S. Appl. No. 16/395,065, filed Apr. 25, 2019.

\* cited by examiner

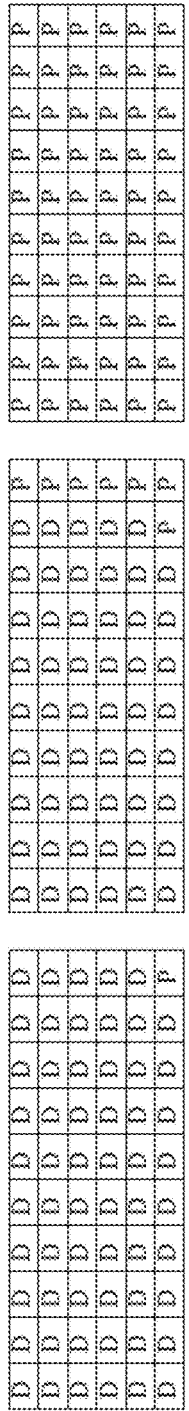
FIG. 6A
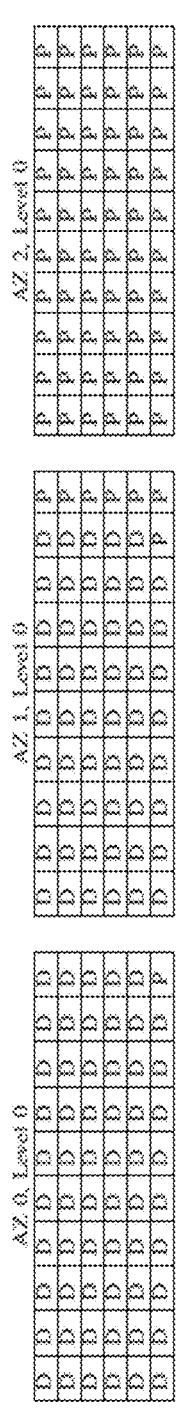
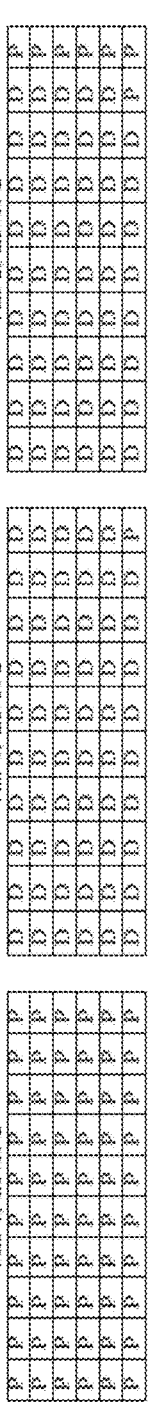
FIG. 6B

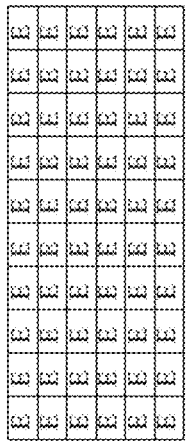
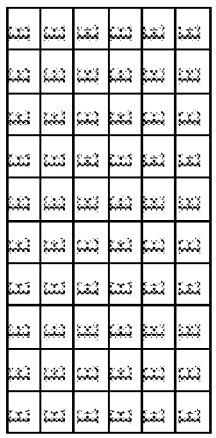
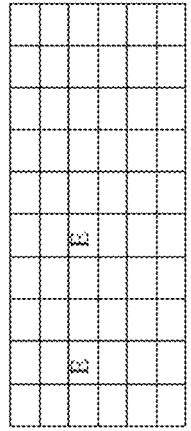
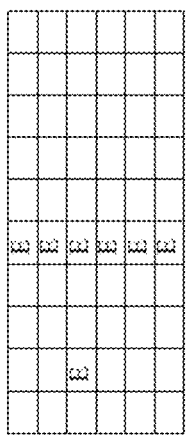
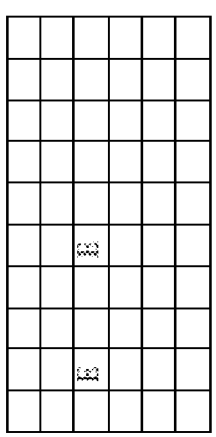
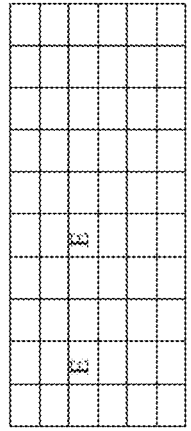
FIG. 10A
FIG. 10B
FIG. 10C

 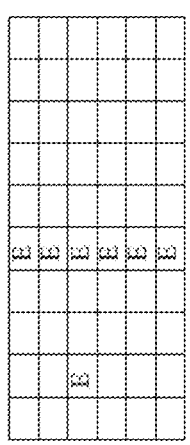 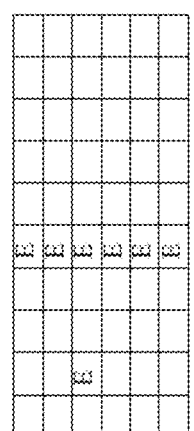
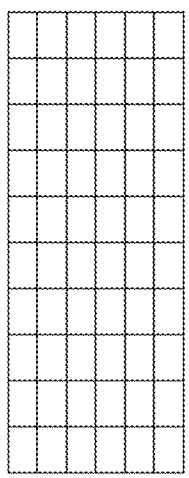
FIG. 11A
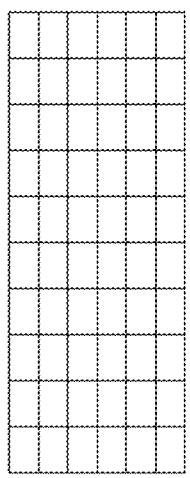
FIG. 11B
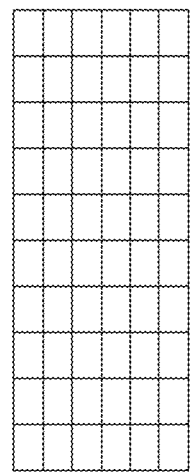
FIG. 11C

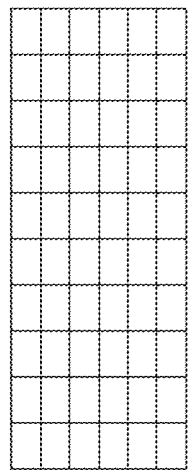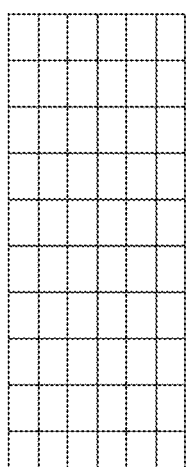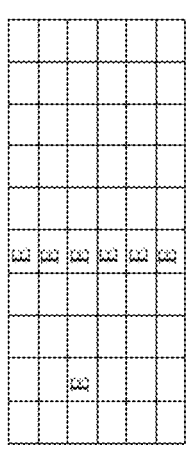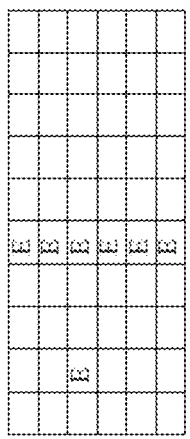
FIG. 12A
FIG. 12B

| Vector | Power of $\beta$ |
|---|---|
| 000 | 0 |
| 100 | 1 |
| 010 | $\beta$ |
| 001 | $\beta^2$ |
| 110 | $\beta^3$ |
| 011 | $\beta^4$ |
| 111 | $\beta^5$ |
| 101 | $\beta^6$ |

FIG. 13A

| 111 | 000 | 011 |
|---|---|---|
| 001 | 100 | 110 |
| 101 | 110 | xxx |

| 100 | 011 | xxx |
|---|---|---|
| 011 | 111 | xxx |
| 110 | xxx | xxx |

| xxx | xxx | xxx |
|---|---|---|
| xxx | xxx | xxx |
| xxx | xxx | xxx |

FIG. 13B

| $\beta^5$ | 0 | $\beta^4$ |
|---|---|---|
| $\beta^2$ | 1 | $\beta^3$ |
| $\beta^6$ | $\beta^3$ | X |

| 1 | $\beta^4$ | X |
|---|---|---|
| $\beta^4$ | $\beta^5$ | X |
| $\beta^3$ | X | X |

| X | X | X |
|---|---|---|
| X | X | X |
| X | X | X |

FIG. 13C

| $\beta^5$ | 0 | $\beta^4$ |
|---|---|---|
| $\beta^2$ | 1 | $\beta^3$ |
| $\beta^6$ | $\beta^3$ | 1 |

| 1 | $\beta^4$ | $\beta^3$ |
|---|---|---|
| $\beta^4$ | $\beta^5$ | $\beta^2$ |
| $\beta^3$ | $\beta^6$ | 1 |

| $\beta^4$ | $\beta^4$ | $\beta^6$ |
|---|---|---|
| $\beta$ | $\beta^4$ | $\beta^5$ |
| $\beta^4$ | $\beta^4$ | 0 |

FIG. 13D

| 111 | 000 | 011 |
|---|---|---|
| 001 | 100 | 110 |
| 101 | 110 | 100 |

| 100 | 011 | 110 |
|---|---|---|
| 011 | 111 | 001 |
| 110 | 101 | 100 |

| 011 | 011 | 101 |
|---|---|---|
| 010 | 011 | 111 |
| 011 | 011 | 000 |

FIG. 13E

| 111 | xxx | 011 |
|-----|-----|-----|
| 001 | xxx | 110 |
| xxx | xxx | 100 |

| xxx | xxx | xxx |
|-----|-----|-----|
| xxx | xxx | xxx |
| xxx | xxx | xxx |

| 011 | 011 | 101 |
|-----|-----|-----|
| 010 | 011 | xxx |
| 011 | 011 | 000 |

FIG. 14A

| $\beta^5$ | X | $\beta^4$ |
|-----------|---|-----------|
| $\beta^2$ | X | $\beta^3$ |
| X | X | 1 |

| X | X | X |
|---|---|---|
| X | X | X |
| X | X | X |

| $\beta^4$ | $\beta^4$ | $\beta^6$ |
|-----------|-----------|-----------|
| $\beta$ | $\beta^4$ | X |
| $\beta^4$ | $\beta^4$ | 1 |

FIG. 14B

| $\beta^5$ | 0 | $\beta^4$ |
|-----------|---|-----------|
| $\beta^2$ | 1 | $\beta^3$ |
| $\beta^6$ | $\beta^3$ | 1 |

| 1 | $\beta^4$ | $\beta^3$ |
|---|-----------|-----------|
| $\beta^4$ | $\beta^5$ | $\beta^2$ |
| $\beta^3$ | $\beta^6$ | 1 |

| $\beta^4$ | $\beta^4$ | $\beta^6$ |
|-----------|-----------|-----------|
| $\beta$ | $\beta^4$ | $\beta^5$ |
| $\beta^4$ | $\beta^4$ | 0 |

| 1x0 | xxx | 01x |
|-----|-----|-----|
| xxx | xxx | 11x |
| 10x | xxx | x10 |

| x01 | xxx | 0x0 |
|-----|-----|-----|
| 0x1 | 11x | x11 |
| 11x | 1x1 | x11 |

| xxx | xxx | xxx |
|-----|-----|-----|
| xxx | xxx | xxx |
| xxx | xxx | xxx |

FIG. 16A

| 110 | xxx | 011 |
|-----|-----|-----|
| xxx | xxx | 110 |
| 101 | xxx | 110 |

| 101 | xxx | 000 |
|-----|-----|-----|
| 011 | 110 | 011 |
| 110 | 101 | 011 |

| xxx | xxx | xxx |
|-----|-----|-----|
| xxx | xxx | xxx |
| xxx | xxx | xxx |

FIG. 16B

| 110 | 000 | 011 |
|-----|-----|-----|
| 000 | 101 | 110 |
| 101 | 110 | 110 |

| 101 | 011 | 000 |
|-----|-----|-----|
| 011 | 110 | 011 |
| 110 | 101 | 011 |

| 011 | 011 | 011 |
|-----|-----|-----|
| 011 | 011 | 101 |
| 011 | 011 | 101 |

FIG. 16C

RECOVERING FAILED DEVICES IN DISTRIBUTED DATA CENTERS

BACKGROUND

The present invention relates to recovering failed devices in distributed data centers, and more particularly, this invention relates to recovering failed devices in cloud storage systems and networks.

Reliable delivery of data is an essential aspect of data storage systems. Error detection and correction schemes are used to detect errors in data delivery and reconstruct data when an error is detected. Error detection and correction schemes are especially important for delivery of data over unreliable communication channels and/or channels which are subject to noise. Data redundancy schemes, such as parity computation, enable reliable delivery of data using error detection and correction techniques by adding redundancy and/or extra data to a message. Redundancy and/or extra data may be used to check the message for consistency with the original message.

Erasure codes with high efficiency and high loss tolerance are important for data storage systems where there are a variety of loss mechanisms. In a storage cluster comprising multiple availability zones (AZs), it is important to protect against the loss of an AZ. In large scale data storage (e.g., in cloud storage) there is a high probability that, at any point in time, there are some component losses under repair.

Multiple devices may fail concurrently in distributed data centers where each device is under one or more unique fail mode scenarios. A variety of failures may occur including a loss of a complete data center, a loss of a box of individual storage devices in a data center, loss of individual storage devices within a box, and/or sectors within a storage device. Existing solutions do not account for all the various failures modes and/or require a low rate of data devices with respect to the total number of devices in the system.

SUMMARY

A computer-implemented method, according to one embodiment, enables reconstructing contents of blocks in a storage system having l availability zones (AZs), a set of n storage units in each AZ arranged as columns, and a set of m storage blocks in each storage unit. The storage blocks of n+1 of the storage units are parity blocks, where l−1 of the AZs each include an additional parity block. The method includes using the parity blocks and/or data in the AZs and reconstructing contents of blocks in the storage system having l availability zones (AZs) from a concurrent loss of: one of the AZs, a storage unit together with one storage block in one of the remaining l−1 AZs, and one further storage block in each of the remaining l−2 AZs of the storage system. The further storage block in each of the remaining l−2 AZs of the storage system is reconstructed within each of the corresponding AZs without invoking the other AZ(s) of the l−1 AZs.

A computer program product, according to one embodiment, includes a computer readable storage medium having programs instructions embodied therewith. The program instructions are executable by a computer to cause the computer to perform the foregoing computer-implemented method.

A system, according to one embodiment, includes a processor and logic which is integrated with the processor, executable by the processor, or integrated with and executable by the processor. The logic is configured to perform the foregoing computer-implemented method.

Other aspects and embodiments of the present invention will become apparent from the following detailed description, which, when taken in conjunction with the drawings, illustrate by way of example the principles of the invention.

DESCRIPTION OF THE DRAWINGS

FIG. 4 is an erasure code for a system comprising a set of 10 optical storage units, according to one embodiment.

FIG. 5 is a multi-AZ cluster, according to one embodiment.

FIG. 6A is a system of l=3, m=6, and n=10, according to one embodiment.

FIG. 6B demonstrates parity rotation across the AZs, according to one embodiment.

FIG. 10A illustrates an example comprising an erased last AZ and no AZ comprising a single erasure, according to one embodiment.

FIG. 10B is the result of correcting the rows containing only one erasure in the second AZ, according to one embodiment.

FIG. 10C is the result of correcting every erasure in the last AZ except for the two erasures corresponding to the two erasures in the corresponding locations in the second AZ, according to one embodiment.

FIG. 11A illustrates a last AZ comprising an erased column and a random erasure and a second AZ which is completely erased, according to one embodiment.

FIG. 11B is the result of correcting the erasures in the completely erased AZ which do not correspond to the erased column and the random erasure of the last AZ, according to one embodiment.

FIG. 11C is the result of correcting the rows in the second AZ comprising only one erasure, according to one embodiment.

FIG. 12A illustrates a last AZ which comprises zero erasures, according to one embodiment.

FIG. 12B is the result of correcting the erasures in the completely erased AZ which do not correspond to the erased locations in the AZ with one erased column and one random erasure, according to one embodiment.

FIG. 13A is a table of elements in GF(8) where each element may be a 3-bit vector and/or a power of β, according to one embodiment.

FIG. 13B is a table of data for encoding where xs correspond to the bits to be computed by the encoding algorithm, according to one embodiment.

FIG. 13C is the output of writing the elements of FIG. 13B as powers of β according to the table in FIG. 13A, according to one embodiment.

FIG. 13D is the output of the final encoded three AZs, according to one embodiment.

FIG. 13E is the output of the final encoded three AZs written in vector form, according to one embodiment.

FIG. 14A is a table of data for decoding where xs correspond to the bits which are erased, according to one embodiment.

FIG. 14B is the output of writing the elements of FIG. 14A as powers of β, according to one embodiment.

FIG. 14C is the output of the three decoded AZs, according to one embodiment.

FIG. 15A is an example in C(3, 3, 3; 3) for three 3×3 AZs where the prime number is p=3, according to one embodiment.

FIG. 15B is the output of computing the third bit in each entry comprising two bits in the first two AZs, according to one embodiment.

FIG. 15C is the final encoded three AZs according to the encoding algorithm, according to one embodiment.

FIG. 16A is an example in C(3, 3, 3; 3), according to one embodiment.

FIG. 16B is the output of XORing the remaining two blocks, according to one embodiment.

FIG. 16C is the final decoded three AZs according to the decoding algorithm, according to one embodiment.

DETAILED DESCRIPTION

Figure 1:
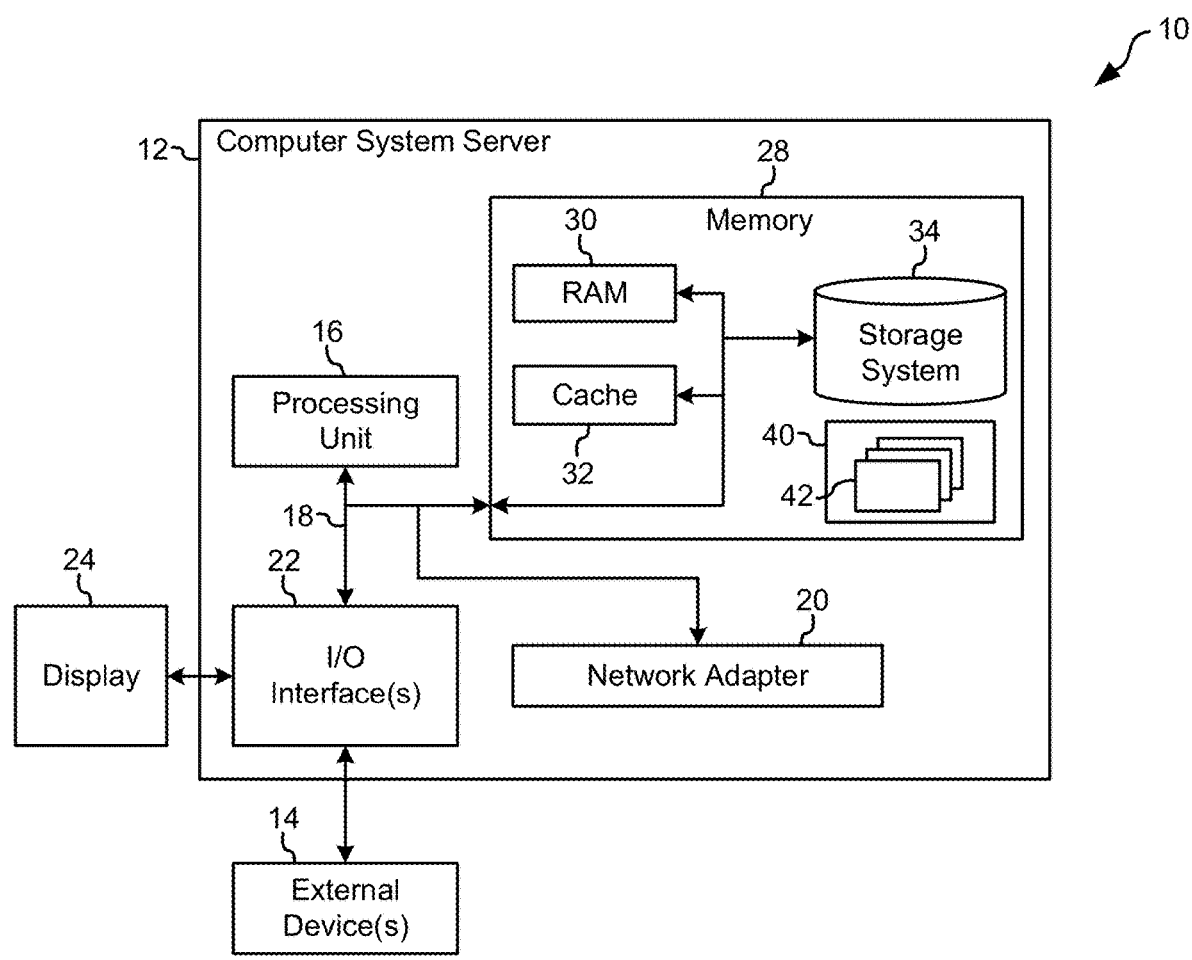
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of protecting l data centers, where each data center consists of an m×n array of storage devices.

In one general embodiment, a computer-implemented method enables reconstructing contents of blocks in a storage system having l availability zones (AZs), a set of n storage units in each AZ arranged as columns, and a set of m storage blocks in each storage unit. The storage blocks of n+1 of the storage units are parity blocks, where l−1 of the AZs each include an additional parity block. The method includes using the parity blocks and/or data in the AZs and reconstructing contents of blocks in the storage system having l availability zones (AZs) from a concurrent loss of: one of the AZs, a storage unit together with one storage block in one of the remaining l−1 AZs, and one further storage block in each of the remaining l−2 AZs of the storage system. The further storage block in each of the remaining l−2 AZs of the storage system is reconstructed within each of the corresponding AZs without invoking the other AZ(s) of the l−1 AZs.

In another general embodiment, a computer program product includes a computer readable storage medium having programs instructions embodied therewith. The program instructions are executable by a computer to cause the computer to perform the foregoing computer-implemented method.

In yet another general embodiment, a system includes a processor and logic which is integrated with the processor, executable by the processor, or integrated with and executable by the processor. The logic is configured to perform the foregoing computer-implemented method.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

In various approaches, the processor 16 for performing and/or coordinating various embodiments of the present invention may be in any availability zone in a storage system, on a server 12, on a remote computer, or any combination of locations.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
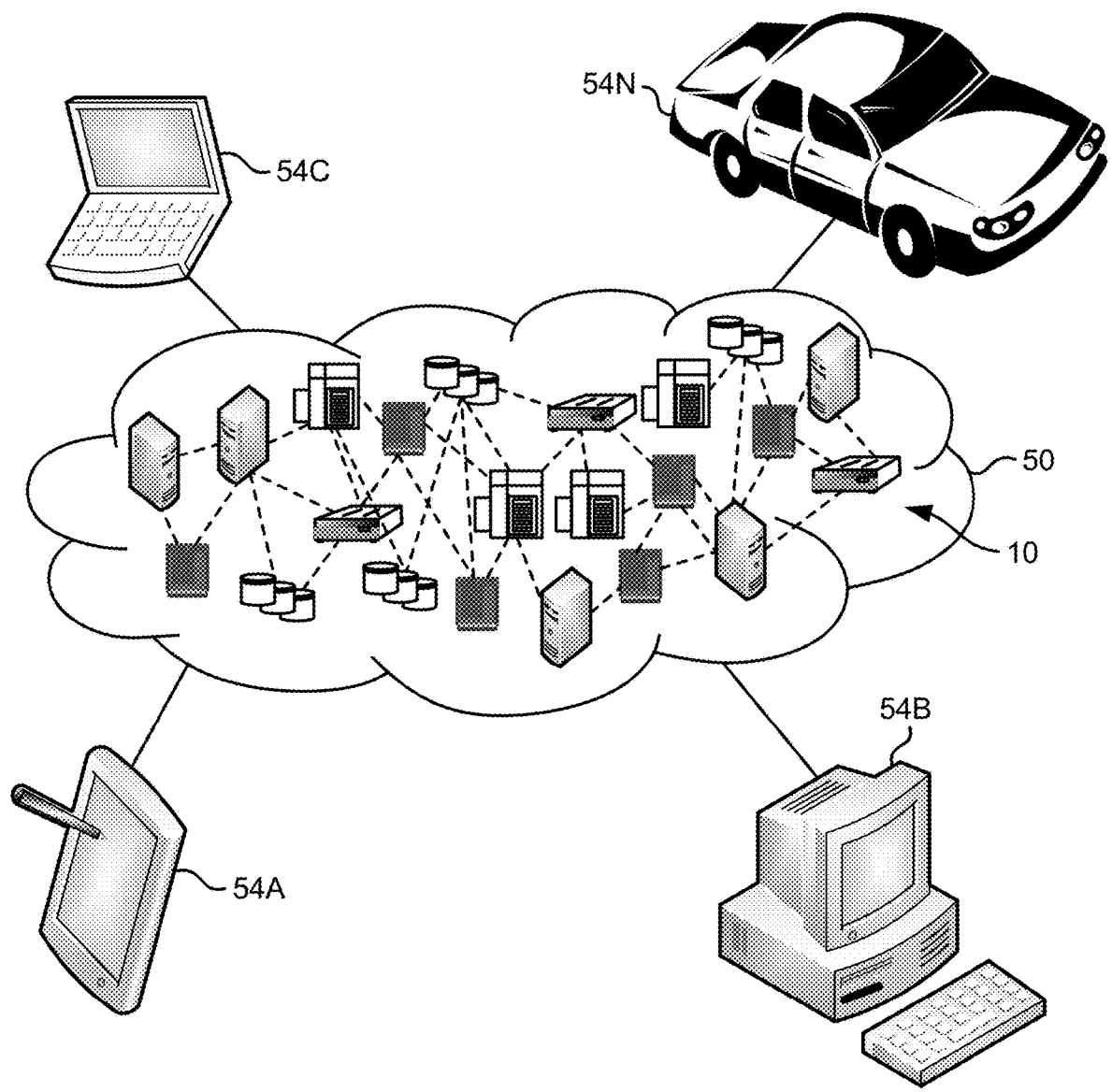
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
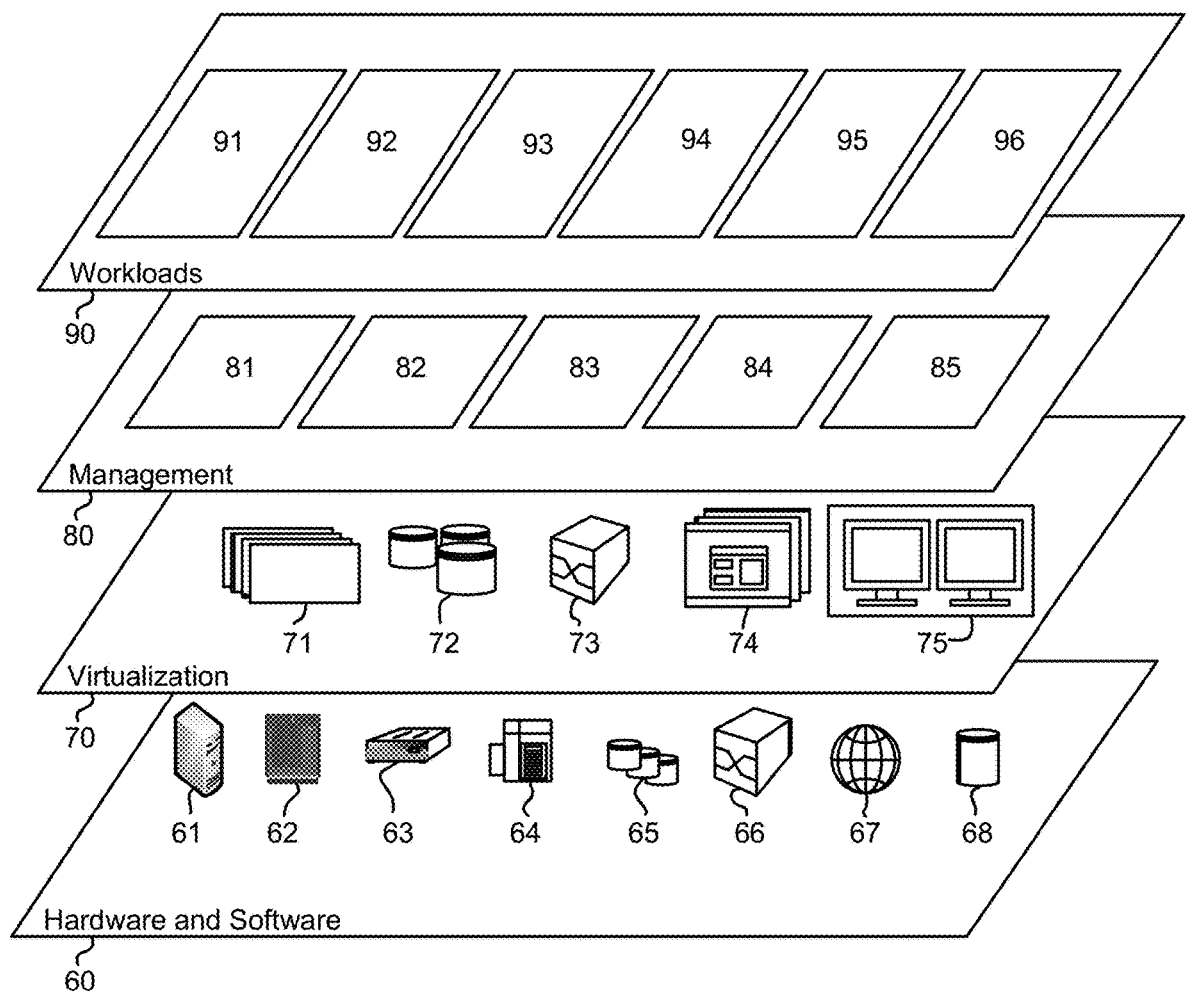
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device recovery 96.

Multiple devices may fail concurrently in distributed data centers where each device is under one or more unique fail mode scenarios. A variety of failures may occur including a loss of a complete data center, a box of individual storage devices in a data center, individual storage devices within a box, and/or sectors within a storage device. Existing solutions do not account for all the various failures modes and/or require a low rate of data devices with respect to the total number of devices in the system.

Erasure codes with high efficiency and high loss tolerance are important for data storage systems where there are a variety of loss mechanisms. In a storage cluster comprising multiple availability zones (AZs), it is important to protect against the loss of an AZ. An availability zone may be a logically and/or physically isolated location from other zones with independent power, cooling, and network infrastructures in order to strengthen fault tolerance by avoiding single points of failure between zones. Availability zones provide high bandwidth and low inter-zone latency within a region. In large scale data storage (e.g., in cloud storage) there is a high probability that, at any point in time, there are some component losses under repair.

Large data storage systems includes several independent failure domains. Typically, each availability zone comprises independent failure domains for various units, blocks, columns, discs, sectors, etc. within the zone. It would be beneficial to protect smaller units of data stored within a zone without invoking data from other zones. Invoking data from other zones may be an inefficient use of resources (e.g., the greater the distance from which data is pulled, the more resources are used to invoke data from other zones).

In various preferred embodiments as described herein, three data centers may be considered comprising mxn storage devices distributed in an m×n array. Each column in a data center may represent a box of storage devices in some embodiments. The third AZ may be the XOR of the previous two AZs such that, if a data center fails, it may be recovered from the other two AZs if the other two AZs are intact (e.g., erasure free). One column in the first two data centers may correspond to parity and one storage device in each of the first two data centers. Various embodiments of the present invention provide for recovery of a whole data center failures, recovery of one column in the two surviving data centers, and recovery of individual storage device failures in each data center.

Figures 4, 5:
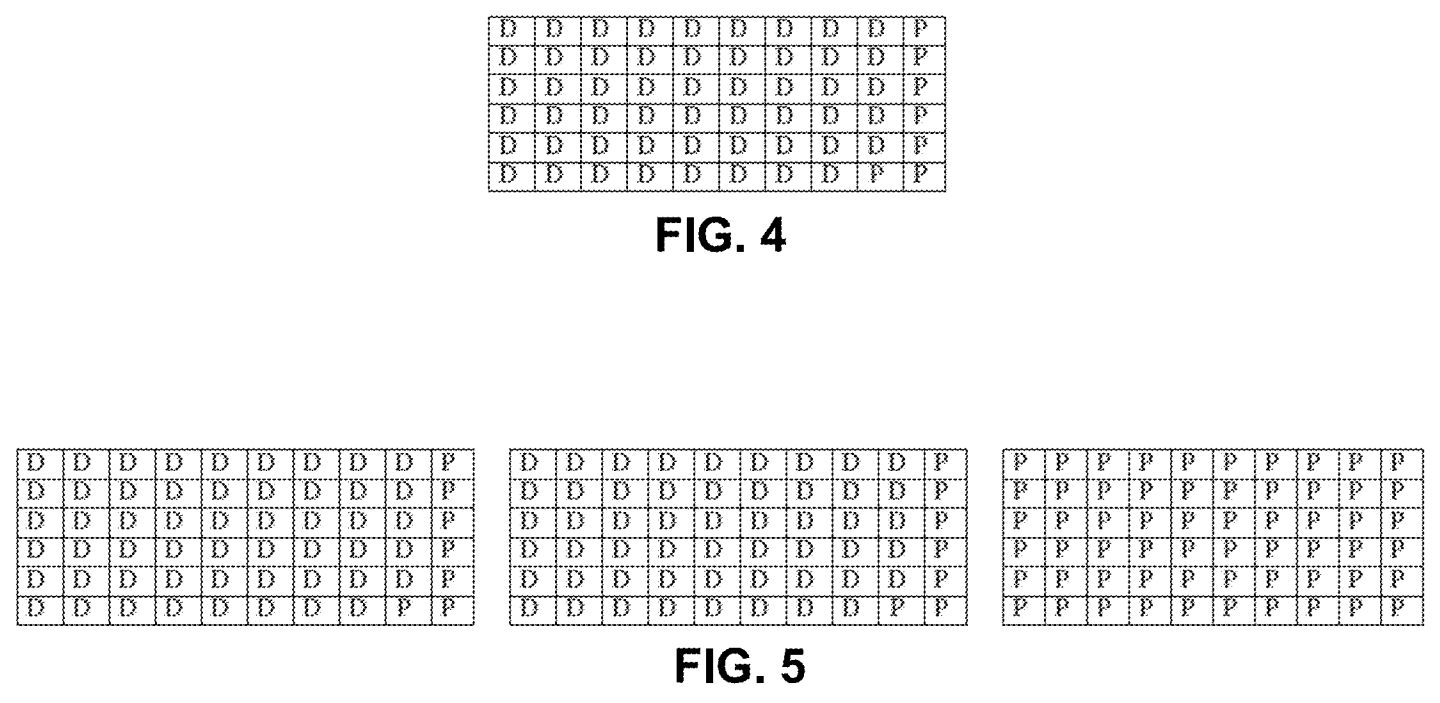

FIG. 4 is an erasure code for a system comprising a set of 10 optical storage units. Each unit comprises a robot, a set of drives, and a set of blocks. The blocks within the system may be grouped into sets of 6 associated with each unit. In one embodiment, there is an array of 60 blocks in the system protection group. The erasure code may prevent media loss within each unit. The erasure code may prevent unit and/or robot loss within the system.

The row parities may provide protection against unit loss where each column represents a storage unit and each row represents a block of storage on a disc in a unit. The extra parity shown in the final row may be a global parity which protects against block loss anywhere. In one embodiment, a block of storage refers to a set of data locations. In another embodiment, the efficiency of the erasure code shown in FIG. 4 is about 88%.

FIG. 5 is a multi-AZ cluster. The multi-AZ cluster may be protected against AZ loss. The first two AZs comprise data as in the single system case (see FIG. 4). The data located within the third AZ comprises parity of the data in the first two AZs.

The erasure code for the multi-AZ cluster may be a product code with an efficiency of 59% (e.g., 88%× 67%=59%). Various embodiments of the present invention using the same arrangement of 10 units in each AZ comprise an improved data efficiency of approximately 62%. Various operations disclosed herein replace the $10^{th}$ unit in FIG. 5 with a unit comprising substantially all data in order to protect against the simultaneous loss of an AZ, a further unit from the remaining units, and a further block from each remaining AZ. Sublocations within blocks may be referred to herein as sectors.

In various embodiments, l AZs each comprise n storage units, where l≥3. Each unit comprises m storage blocks and each block comprises b sectors. In some embodiments, a set of n storage units in each AZ are logically arranged as columns and a set of m storage blocks in each storage unit are logically arranged as rows. In other embodiments, the set of n storage units in each AZ are logically arranged as rows and the set of m storage blocks in each storage unit are logically arranged as columns. In one embodiment, each storage block comprises p sectors wherein p−1 sectors contain data and the remaining sector contains parity. In a preferred embodiment, the number of sectors p is a prime number.

The blocks may be represented as a binary vector of length b where each bit represents a sector. In a first approach, the binary vector of length b may be in a finite field (e.g., Galois field) $GF(2^b)$. There are $2^b$ possible vectors without any restriction for each vector. In one embodiment, each storage block comprises an element in the finite field $GF(2^b)$.

In a second approach, assume b=p and p is a prime number where p≥max{m,n}. The blocks may be vectors of length p with the restriction that the number of ones in each block is even. Using this approach, if one of the bits (e.g., sectors) in the block fails, it may be retrieved by XORing the remaining p−1 bits without invoking bits from another block.

It should be understood by one having ordinary skill in the art that the hierarchical method disclosed herein may be extended to more parameters than those provided in various examples in order to protect individual sectors, blocks, units, AZs, etc. For example, the various variables (e.g., l, m, n, p, b, etc.) may be any suitable value according to any constraints provided (e.g., p is a prime number, etc.).

FIG. 6A is a system of l=3, m=6, and n=10. These parameters may be used for various examples provided herein although one having ordinary skill in the art will understand upon reading the present disclosure that any parameters may be used. Each entry in each AZ comprises a vector of length b. If there are no restrictions, the vector of length b may be represented by a polynomial modulo f(x), where f(x) is a primitive polynomial of degree b.

In the second approach, each entry in each AZ comprises a polynomial of even parity modulo $1+x^p$, where p is a prime number. Each polynomial may be represented as a vector. Each polynomial may be represented as a polynomial in α of degree at most p−1 such that $α^p=1$.

For example, take p=5 and consider the vector (1, 1, 0, 1, 1) which has even parity. Written as a polynomial in α, the vector corresponds to the polynomial $1+α+α^3+α^4$. Multiplying a polynomial by $α^i$ at corresponds to rotating the vector i times to the right. Compute $α^2(1+α+α^3+α^4)=α^2+α^3+α^5+α^6$ to obtain $1+α+α^2+α^3$, where $α^5=1$, which corresponds to vector (1, 1, 1, 1, 0) and a rotation two times to the right of vector (1, 1, 0, 1, 1). Any erased bit may be recovered by XORing the remaining non-erased p−1 bits where the polynomials have even parity.

In preferred embodiments, p=257 where each entry consists of a polynomial modulo $1+x^{257}$ with even parity (e.g., a binary vector of length 257 with an even number of ones).

Each entry may be denoted by D where the entry comprises data. Each entry may be denoted by P where the entry comprises parity. A third AZ may comprise the XOR of the other two AZs. The rate of the code may approach 62% where the last column in the first AZ, which previously comprised parity, currently comprises 5 data entries and one parity entry. The last column in the second AZ is the XOR of the remaining columns in the first two AZs. The remaining two parities affect only the AZ within which the parities are located. A failed sector in a block may be recoverable by XORing the remaining 256 sectors. The whole block may be considered defective if two or more sectors fail. A single block may be locally recovered within an AZ if there is only one failed block in the AZ. Other AZs may need to be invoked if there are more than one failed block in the AZ, where invoking an AZ means accessing one or more blocks in the AZ. A whole unit in the first two AZs may be recovered using the first two AZs provided each one of them comprises, at most, one failed block. A whole AZ may be recovered by XORing the other two AZs provided each AZ does not contain additional failed blocks.

In another approach, the storage space in each AZ may be divided into several parallel levels. When referring to an AZ, this will mean a level of an AZ, unless otherwise specified. FIG. 6B demonstrates data layouts, including parity rotation, across the AZs. For example, if there are three AZs, in a first level, the third AZ is the XOR of the first two AZs; in a second level, the second AZ may be the XOR of the first and the third AZs; in a third level the first AZ is the XOR of the second and the third AZs, and so on. In this approach, no AZ consists exclusively of parity, and the parity is uniformly distributed among the different AZs.

Various embodiments may comprise many recovery paths for many failures. For example, recovering a failed block may be performed by XORing the contents of the corresponding blocks in the other two AZs which may be relatively faster than performing the local recovery.

Approach 1: Finite Field Description

Denote the Kronecker product between matrices A and B by A⊗B. Denote the concatenation of matrices A and B having the same number of rows by A, B. Denote the transpose of matrix A by $A^T$. Denote the i×j $\underline{0}_{i,j}$-matrix by Denote the vector of length i consisting of ones by $\underline{1}_j$. Denote the j×j identity matrix and by $I_j$. Consider a field of $GF(2^b)$ such that $2^b > \max\{m,n\}$ and let β be a primitive element in $GF(2^b)$.

The parity-check matrix for the code is an (m(n+1)+l−1)×(mnl) matrix. In one approach, read the elements horizontally in each AZ, the first AZ sequentially followed by the second, etc. Element (i, j), where $0 \le i \le m-1$, $0 \le j \le n-1$ in AZ u, where $0 \le u \le l-1$, corresponds to column mnu+n(i−1)+j in the parity-check matrix. The parity-check matrix of the code is given by the (m(n+1)+l−1)×(mnl) matrix $$H(\ell, m, n; 2^b) = \begin{pmatrix} (1\beta \ldots \beta^{\ell-2}0) \otimes (I_m \otimes (1\beta \ldots \beta^{n-1})) \\ (I_{\ell-1}, \underline{0}_{\ell-1}^T) \otimes (\underline{1}_m \otimes (1\beta^2 \ldots \beta^{2(n-1)})) \\ \underline{1}_\ell \otimes I_{mn} \end{pmatrix}. \quad (1)$$

Denote the code given by the parity-check matrix H(l, m, n; $2^b$) defined by (1) as C(l, m, n; $2^b$). In a preferred embodiment, l=3, m=6, and n=10. According to the condition of the field, $2^b$ must be greater than 10 (e.g., $2^b$>10), so b=4. According to (1), the code C(3, 6, 10; 16) is defined by the parity-check matrix given by $$H(3, 6, 10; 16) = \begin{pmatrix} (1\beta 0) \otimes (I_6 \otimes (1\beta\beta^2\beta^3\beta^4\beta^5\beta^6\beta^7\beta^8\beta^9)) \\ \begin{pmatrix} 1 & 0 & 0 \\ 0 & 1 & 0 \end{pmatrix} \otimes (\underline{1}_6 \otimes (1\beta^2\beta^4\beta^6\beta^8\beta^{10}\beta^{12}\beta^{14}\beta^{16}\beta^{18})) \\ \underline{1}_3 \otimes I_{60} \end{pmatrix}. \quad (2)$$

The code C(l, m, n; $2^b$) has a minimum distance of 6.

Codewords may be of weight 6. Consider 6 erasures in locations 0, 1, mn, mn+1, (l−1)mn and (l−1)mn+1 which correspond to locations (0,0) and (0,1) in the first, second, and last AZs respectively. The erasures are unsolvable where only 5 parities (e.g., corresponding to 5 different rows of parity-check matrix H(l, m, n; $2^b$)) are used to correct the erasures. All the cases in which only one erasure occurs in an AZ u may be corrected without invoking any other AZ. A single block in each AZ is locally recoverable without invoking data and/or parity from any other AZ. In various approaches, a storage block within each AZ may be reconstructed within the corresponding AZ without invoking the other AZs.

There are no codewords with weight 5. For example, assume there are 5 erasures. Assume if a location (i, j) in one of the AZs is erased, there is another location (i, j) in a different AZ that has also been erased, otherwise, the location (i, j) may be corrected by XORing the corresponding locations (i, j) in the remaining l−1 AZs. Assume that no AZ comprises only one erasure where one erasure may be locally recovered within the AZ without invoking any other AZ. Assume that 4 erasures have occurred. In the case of 4 erasures, the matrix comprising the corresponding columns in the parity-check matrix H(l, m, n; $2^b$) has rank 4.

Figure 7:
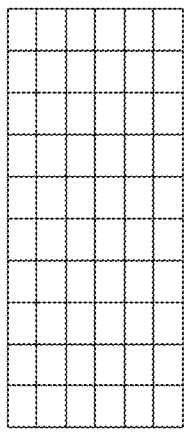
FIG. 7 illustrates a proof of the system comprising l=3, m=6, and n=10, according to one embodiment.

FIG. 7 illustrates a proof of the system comprising l=3, m=6, and n=10. In some approaches, two erasures are in locations (i, $j_0$) and (i, $j_1$) of AZ u, where $0 \le i \le m-1$, $0 \le j_0 < j_1 \le n-1$ and $0 \le u \le l-2$ and the remaining locations in rows i of AZ v, where $0 \le v \le l-2$, contain no erasures. The two erasures are correctable by using the corresponding invertible Vandermonde type matrix:

$$\begin{pmatrix} \beta^{u+j_0} & \beta^{u+j_1} \\ \beta^{2j_0} & \beta^{2j_1} \end{pmatrix}.$$

Figure 8:
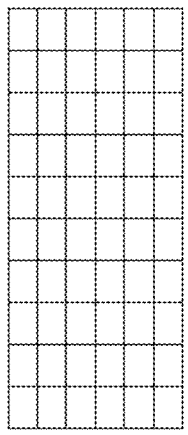
FIG. 8 illustrates erasures in locations (i, j) of AZs $u_0$ and $u_1$ where $0 \leq u_0 < u_1 < l-2$ where there are no erasures in the remaining locations in rows i of AZ v, where $0 \leq v \leq l-2$, according to one embodiment.

FIG. 8 illustrates erasures in locations (i, j) of AZs $u_0$ and $u_1$ where $0 \le u_0 \le u_1 \le l-2$ where there are no erasures in the remaining locations in rows i of AZ v, where $0 \le v \le l-2$. Two rows i have two erasures each which may be corrected independently sequentially. The two erasures are correctable. The two erasures may be corrected by using the invertible matrix:

$$\begin{pmatrix} 1 & 1 \\ \beta^{u_0+j} & \beta^{u_1+j} \end{pmatrix}$$

where $u_0 \ne u_1$.

Figure 9:
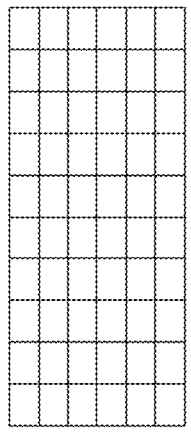
FIG. 9 illustrates 4 erasures where the last AZ is not affected, according to one embodiment.

FIG. 9 illustrates 4 erasures where the last AZ (e.g., the AZ comprising the XOR of the first two l−1 AZs) is not affected. Locations (i, $j_0$) and (i, $j_1$), where $0 \le i \le m-1$ and $0 \le j_0 < j_1 \le n-1$ in AZs $u_0$ and $u_1$, where $0 \le u_0 < u_1 \le l-2$, are erased. The 4 columns of the parity-check matrix H(l, m, n; $2^b$) as given by (1) comprise rank 4. The matrix $$\begin{pmatrix} 1 & 0 & 1 & 0 \\ 0 & 1 & 0 & 1 \\ \beta^{j_0+u_0} & \beta^{j_1+u_0} & \beta^{j_0+u_1} & \beta^{j_1+u_1} \\ 0 & 0 & \beta^{2j_0} & \beta^{2j_1} \end{pmatrix}$$

is invertible, if and only if $$\begin{pmatrix} 1 & 0 & 1 \\ \beta^{j_1-j_0} & 1 \oplus \beta^{u_1-u_0} & \beta^{(j_1-j_0)+(u_1-u_0)} \\ 0 & 1 & \beta^{2(j_1-j_0)} \end{pmatrix}$$

is invertible, if and only if $$\begin{pmatrix} 1 & \beta^{2(j_1-j_0)} \\ 1 \oplus \beta^{u_1-u_0} & \beta^{j_1-j_0}(1 \oplus \beta^{u_1-u_0}) \end{pmatrix}$$

is invertible, if and only if $$\begin{pmatrix} 1 & 1 \\ 1 & \beta^{j_1-j_0} \end{pmatrix}$$

is invertible, which is the case since $j_0 < j_1$.

In one embodiment, the code C(l, m, n; $2^b$) may tolerate an erased AZ with an erased column and a random erased entry in a second AZ, and a random erasure in any of the remaining AZs.

In various embodiments, parity blocks and/or data in the AZs are used to reconstruct the contents of blocks in a storage system having l AZs from a concurrent loss of one of the AZs, a storage unit together with one storage block in one of the remaining l–1 AZs, and one storage block in each of the remaining l–2 AZs. A storage block in each of the remaining l–2 AZs may be reconstructed within the corresponding AZs without invoking the other AZ(s) of the l–1 AZs. Specifically, the storage block in one of the remaining l–2 AZs may be corrected using data in the corresponding AZ without requiring data from any other AZ in the l–1 remaining AZs. Parity blocks may be used to reconstruct the contents of the blocks in a storage system where only data is erased. Data in the AZs may be used to reconstruct the contents of the blocks in a storage system where only parity data is erased.

In preferred embodiments, n parity storage units are located in one AZ and the content of all the blocks in the storage system are reconstructed in response to the concurrent loss of one AZ, one storage unit together with one storage block in one of the remaining l–1 AZs, and one storage block in each of the remaining l–2 AZs.

FIG. 10A illustrates an example comprising an erased last AZ and no AZ comprising a single erasure. A single erasure may be corrected using local recovery operations as would be understood by one having ordinary skill in the art upon reading the present disclosure. In one approach, the rows containing only one erasure in the second AZ (e.g., in the AZ having an erased column and the random erasure) may be corrected.

FIG. 10B is the result of correcting the rows containing only one erasure in the second AZ (e.g., in the AZ having an erased column and a random erasure). Every erasure in the last AZ may be corrected except for the two erasures corresponding to the two erasures in the corresponding locations in the second AZ.

FIG. 10C is the result of correcting every erasure in the last AZ except for the two erasures corresponding to the two erasures in the corresponding locations in the second AZ. The remaining 4 erasures may be corrected as described above.

FIG. 11A illustrates a last AZ comprising an erased column and a random erasure and a second AZ which is completely erased. The erasures in the completely erased AZ (e.g., the second AZ) which do not correspond to the erased column and the random erasure of the last AZ may be corrected.

FIG. 11B is the result of correcting the erasures in the completely erased AZ (e.g., the second AZ) which do not correspond to the erased column and the random erasure of the last AZ. The rows in the second AZ comprising only one erasure may be corrected.

FIG. 11C is the result of correcting the rows in the second AZ comprising only one erasure. The rows in the last AZ having only one erasure may be corrected leaving 4 erasures in the last AZ. The final 4 erasures may be corrected as described above.

FIG. 12A illustrates a last AZ which comprises zero erasures. The erasures in the completely erased AZ (e.g., the second AZ) which do not correspond to the erased locations in the AZ with one erased column and one random erasure (e.g., the first AZ) may be corrected.

FIG. 12B is the result of correcting the erasures in the completely erased AZ (e.g., the second AZ) which do not correspond to the erased locations in the AZ with one erased column and one random erasure (e.g., the first AZ). If the location (i, j) in both AZs $u_0$ and $u_1$ is erased, where $0 \leq u_0 < u_1 \leq l-2$ and there are no erasures in the remaining locations (i, v) where $v \neq j$, the two erasures are correctable where the determinant $$\begin{pmatrix} 1 & 1 \\ \beta^{j+u_0} & \beta^{j+u_1} \end{pmatrix}$$

is invertible. Correcting all such instances leaves 4 erasures which may be corrected as discussed above.

Encoding Algorithm for C(l, m, n; $2^b$)

In various embodiments, to encode for the code C(l, m, n; $2^b$), denote entry (i, j) in AZ u, where $0 \leq i \leq m-1$, $0 \leq j \leq n-1$, and $0 \leq u \leq l-1$, by $a_{i,j}^{(u)}$. The parity blocks may be $a_{m-1,n-1}^{(u)}$ for $0 \leq u \leq l-3$, $a_{i,n-1}^{(l-2)}$ or $0 \leq i \leq m-1$, $a_{m-1,n-2}^{(l-2)}$ and $a_{i,j}^{(l-1)}$ for $0 \leq i \leq m-1$ and $0 \leq j \leq n-1$. In one approach, the entries are initially assumed to be zero.

To encode the blocks $\hat{a}_{i,j}^{(u)}$ where $0 \leq u \leq l-3$, $0 \leq i \leq m-1$, $0 \leq j \leq n-1$ when $i \leq m-2$, $0 \leq j \leq n-2$ when $i = m-1$, and $\hat{a}_{i,j}^{(l-2)}$ where $0 \leq i \leq m-1$, $0 \leq j \leq n-2$ when $i \leq m-2$, $0 \leq j \leq n-3$ when $i = m-1$, into code C(l, m, n; $2^b$), where each $\hat{a}_{i,j}^{(u)}$ is a vector of length b in the finite field GF($2^b$).

Step 1: Compute the following syndromes:

$$S^{(u)} = \bigoplus_{i=0}^{m-1} \bigoplus_{j=0}^{n-1} \beta^{2j} a_{i,j}^{(u)} \text{ for } 0 \leq u \leq \ell-2 \tag{3}$$

$$S_i = \bigoplus_{v=0}^{\ell-2} \bigoplus_{j=0}^{n-1} \beta^{j+v} a_{i,j}^{(v)} \text{ for } 0 \leq i \leq m-1 \tag{4}$$

$$S_{i,j}^{(\ell-1)} = \bigoplus_{v=0}^{\ell-2} a_{i,j}^{(v)} \text{ for } 0 \leq i \leq m-1, 0 \leq j \leq n-1. \tag{5}$$

Step 2: Let $a_{m-1,n-1}^{(u)} = \beta^{-2(n-1)} S^{(u)}$ for $0 \leq u \leq l-3$ and make $$S_{m-1} \leftarrow S_{m-1} \oplus \bigoplus_{u=0}^{\ell-3} \beta^{u+n-1} a_{m-1,n-1}^{(u)}$$

$$S_{m-1,n-1}^{(\ell-1)} \leftarrow S_{m-1,n-1}^{(\ell-1)} \oplus \bigoplus_{u=0}^{\ell-3} a_{m-1,n-1}^{(u)}.$$

Step 3: Let $a_{i,n-1}^{(l-2)} = \beta^{-(n+l-3)} S_i$ for $0 \leq i \leq m-2$ and make $$S^{(\ell-2)} \leftarrow S^{(\ell-2)} \oplus \beta^{2(n-1)} \bigoplus_{i=0}^{m-2} a_{i,n-1}^{(\ell-2)}$$

$$S_{i,n-1}^{(\ell-1)} \leftarrow S_{i,n-1}^{(\ell-1)} \oplus a_{i,n-1}^{(l-2)} \text{ for } 0 \leq i \leq m-2.$$

Step 4: Triangulate the system $$\beta^{n+l-4} a_{m-1,n-2}^{(l-2)} \oplus \beta^{n+l-3} a_{m-1,n-1}^{(l-2)} = S_{m-1}$$

$$\beta^{2(n-2)} a_{m-1,n-2}^{(l-2)} \oplus \beta^{2(n-1)} a_{m-1,n-1}^{(l-2)} = S^{(l-2)}.$$

The system becomes $$a_{m-1,n-2}^{(l-2)} \oplus \beta a_{m-1,n-1}^{(l-2)} = \beta^{-(n+l-4)} S_{m-1}$$

$$a_{m-1,n-2}^{(l-2)} \oplus \beta^2 a_{m-1,n-1}^{(l-2)} = \beta^{-2(n-2)} S^{(l-2)}$$

where $$a_{m-1,n-2}^{(l-2)} \oplus \beta a_{m-1,n-1}^{(l-2)} = \beta^{-(n+l-4)} S_{m-1}$$

$$(1 \oplus \beta) a_{m-1,n-1}^{(l-2)} = \beta^{-(n+l-3)} S_{m-1} \oplus \beta^{-2n+3} S^{(l-2)}$$

to obtain $$a_{m-1,n-1}^{(l-2)} = \frac{\beta^{-(n+l-3)} S_{m-1} \oplus \beta^{-2n+3} S^{(l-2)}}{(1 \oplus \beta)}$$

$$a_{m-1,n-2}^{(l-2)} = \beta^{-(n+l-4)} S_{m-1} \oplus \beta a_{m-1,n-1}^{(l-2)}.$$

Update $S_{m-1,j}^{(l-1)} \leftarrow S_{m-1,j}^{(l-1)} \oplus a_{m-1,j}^{(l-2)}$ for $n-2 \leq j \leq n-1$.

Step 5: Let $a_{i,j}^{(l-1)} = S_{i,j}^{(l-1)}$ for $0 \leq i \leq m-1$, $0 \leq j \leq n-1$, to complete the encoding.

Example 1

In one example, a code C(3, 3, 3; 8) for three 3×3 AZs over the finite field GF(8) may be used. Assume that β is a primitive element in GF(8) such that $1 + \beta + \beta^3 = 0$. FIG. 13A is a table of elements in GF(8) where each element may be a 3-bit vector and/or a power of β. FIG. 13B is a table of data for encoding where xs correspond to the bits to be computed by the encoding algorithm described above. FIG. 13C is the output of writing the elements of FIG. 13B as powers of β as according to the table in FIG. 13A. The elements to be computed by the algorithm are denoted by X.

Compute the syndromes according to Step 1:

$$S^{(0)} = (\beta^5 \oplus \beta^4 \beta^4) \oplus (\beta^2 \oplus \beta^2 \oplus \beta^4 \beta^3) \oplus (\beta^6 \oplus \beta^2 \beta^3) = \beta^4$$

$$S^{(1)} = (1 \oplus \beta^2 \beta^4) \oplus (\beta^4 \oplus \beta^2 \beta^5) \oplus \beta^3 = 0$$

$$S_0 = (\beta^5 \oplus \beta^2 \beta^4) \oplus (\beta \oplus \beta^2 \beta^4) = \beta^6$$

$$S_1 = (\beta^2 \oplus \beta \oplus \beta^2 \beta^3) \oplus (\beta \beta^4 \oplus \beta^2 \beta^5) = \beta^5$$

$$S_2 = (\beta^6 \oplus \beta \beta^3) \oplus \beta \beta^3 = \beta^6$$

$$S_{0,0}^{(2)} = \beta^5 \oplus 1 = \beta^4$$

$$S_{0,1}^{(2)} = \beta^4$$

$$S_{0,2}^{(2)} = \beta^4$$

$$S_{1,0}^{(2)} = \beta^2 \oplus \beta^4 = \beta$$

$$S_{1,1}^{(2)} = 1 \oplus \beta^5 = \beta^4$$

$$S_{1,2}^{(2)} = \beta^3$$

$$S_{2,0}^{(2)} = \beta^6 \oplus \beta^3 = \beta^4$$

$$S_{2,1}^{(2)} = \beta^3$$

$$S_{2,2}^{(2)} = 0$$

where $\beta^3 = 1$ and $\alpha^4 = \alpha$.

Obtain the following according to Step 2, where l−3=0, $$a_{2,2}^{(0)} = \beta^{-4} S^{(0)} = \beta^3 \beta^4 = 1$$

$$S_2 \leftarrow S_2 \oplus \beta^2 a_{2,2}^{(0)} = \beta^6 \oplus \beta^2 = 1$$

$$S_{2,2}^{(2)} \leftarrow S_{2,2}^{(2)} \oplus a_{2,2}^{(0)} = 1.$$

Then, according to Step 3, $$a_{0,2}^{(1)} = \beta^{-3} S_0 = \beta^4 \beta^6 = \beta^3$$

$$a_{1,2}^{(1)} = \beta^{-3} S_1 = \beta^4 \beta^5 = \beta^2$$

$$S^{(1)} \leftarrow S^{(1)} \oplus \beta^4 (a_{0,2}^{(1)} \oplus a_{1,2}^{(1)}) = \beta^4 (\beta^3 \oplus \beta^2) = \beta^2$$

$$S_{0,2}^{(2)} \leftarrow S_{0,2}^{(2)} \oplus a_{0,2}^{(1)} = \beta^4 \oplus \beta^3 = \beta^6$$

$$S_{1,2}^{(2)} \leftarrow S_{1,2}^{(2)} \oplus a_{1,2}^{(1)} = (101) = \beta^3 \oplus \beta^2 = \beta^5.$$

Since $\frac{1}{1 \oplus \beta} = \beta^4$, according to Step 4, $$a_{2,2}^{(1)} = \frac{\beta^{-3} S_2 \oplus \beta^4 S^{(1)}}{1 \oplus \beta} = (\beta^4 \oplus \beta^4 \beta^2) \beta^4 = 1$$

$$a_{2,1}^{(1)} = \beta^{-2} S_2 = \beta a_{2,2}^{(1)} = \beta^5 \oplus \beta = \beta^6.$$

Update $$S_{2,1}^{(2)} \leftarrow S_{2,1}^{(2)} \oplus a_{2,1}^{(1)} = \beta^3 \oplus \beta^6 = \beta^4$$

$$S_{2,2}^{(2)} \leftarrow S_{2,2}^{(2)} \oplus a_{2,2}^{(1)} = 1 \oplus 1 = 0.$$

According to Step 6, make $a_{i,j}^{(2)} = S_{i,j}^{(2)}$ for $0 \leq i \leq 2$, $0 \leq j \leq 2$.

FIG. 13D is the output of the final encoded three AZs. FIG. 13E is the output of the final encoded three AZs written in vector form.

Decoding Algorithm for C(l, m, n; $2^b$)

Assume that the input $\hat{a}_{i,j}^{(u)}$ for $0 \leq u \leq l-1$, $0 \leq i \leq m-1$, and $0 \leq j \leq n-1$ is received where the input corresponds to a codeword $a_{i,j}^{(u)}$ in the code C(l, m, n; $2^b$) which may comprise erasures. Let β be a primitive element in GF($2^b$). If no erasures exist (e.g., $\hat{a}_{i,j}^{(u)} = a_{i,j}^{(u)}$ for all values), then the output coincides with the input. If erasures do exist, assume that the erased blocks are zero and set s←0.

Step 1: Compute the syndromes $S^{(u)}$ for $0 \leq u \leq l-2$ according to (3), $S_i$ for $0 \leq i \leq m-1$ according to (4), and $S_{i,j}^{(l-1)}$ for $0 \leq i \leq m-1$ and $0 \leq j \leq n-1$ according to $$S_{i,j}^{(l-1)} = \bigoplus_{v=0}^{l-1} a_{i,j}^{(v)}. \quad (6)$$

If the last AZ has exactly one erasure, compute $$S^{(l-1)} = \bigoplus_{i=0}^{m-1} \bigoplus_{j=0}^{n-1} \beta^{2j} a_{i,j}^{(l-1)}. \quad (7)$$

Step 2: For each u, where $0 \leq u \leq l-1$, if AZ u has only one erasure in block $a_{i,j}^{(u)}$, where $0 \leq i \leq m-1$ and $0 \leq j \leq n-1$, compute $$a_{i,j}^{(u)} = \beta^{-2j} S^{(u)}. \quad (8)$$

If no erasures remain, output the decoded AZs. If erasures remain, update the syndromes $S_i \leftarrow S_i \oplus \beta^{j+u} a_{i,j}^{(u)}$ if $0 \leq u \leq l-2$ and $S_{i,j}^{(l-1)} \leftarrow S_{i,j}^{(l-1)} \oplus a_{i,j}^{(u)}$ for each AZ u that has been corrected.

Step 3: For each i, where $0 \leq i \leq m-1$, consider the vectors $a_{i,j}^{(u)}$ such that $0 \leq u \leq l-2$ and $0 \leq j \leq n-1$. If there is exactly one erasure in these vectors, for example, in block $a_{i,j}^{(u)}$ then compute $a_{i,j_0}^{(v)} = \beta^{-j_0-v} S_i$ and update the syndromes $S^{(v)} \leftarrow S^{(v)} \oplus \beta^{2j_0} a_{i,j_0}^{(v)}$ and $S_{i,j_0}^{(l-1)} \leftarrow S_{i,j_0}^{(l-1)} \oplus a_{i,j_0}^{(v)}$. If no erasures remain, output the decoded AZs.

Step 4: For each i and j where $0 \leq i \leq m-1$ and $0 \leq j \leq n-1$, consider the l entries $a_{i,j}^{(u)}$ for $0 \leq u \leq l-1$. If there is exactly one erasure in these 3 entries, for example, in entry $a_{i,j}^{(u_0)}$, compute $a_{i,j}^{(u_0)} = S_{i,j}^{(l-1)}$ and update the syndromes $S^{(u_0)} \leftarrow S^{(u_0)} \oplus \beta^{2j} a_{i,j}^{(u_0)}$ if $u_0 < l-1$, $S_i \leftarrow S_i \oplus \beta^{j+u_0} a_{i,j}^{(u_0)}$. If no erasures remain, output the decoded AZs.

Step 5: For each i, where $0 \leq i \leq m-1$, consider locations $a_{i,j}^{(u)}$ such that $0 \leq u \leq l-1$ and $0 \leq j \leq n-1$. If there are exactly two erasures in locations $a_{i,j_0}^{(u_0)}$ and $a_{i,j_0}^{(u_1)}$ where $0 \leq u_0 < u_1 \leq l-2$ and the remaining locations $a_{i,j}^{(u)}$ are erasure free, solve the system $$a_{i,j_0}^{(u_0)} \oplus a_{i,j_0}^{(u_1)} = S_{i,j_0}^{(l-1)}$$

$$\beta^{j_0+u_0} a_{i,j_0}^{(u_0)} \oplus \beta^{j_0+u_1} a_{i,j_0}^{(u_1)} = S_i.$$

Triangulate the system to obtain $$a_{i,j_0}^{(u_0)} \oplus a_{i,j_0}^{(u_1)} = S_{i,j_0}^{(l-1)}$$

$$(1 \oplus \beta^{u_1-u_0}) a_{i,j_0}^{(u_1)} = S_{i,j_0}^{(l-1)} \oplus \beta^{-j_0-u_0} S_i,$$

which gives $$a_{i,j_0}^{(u_1)} = \frac{S_{i,j_0}^{(l-1)} \oplus \beta^{-j_0-u_0} S_i}{1 \oplus \beta^{u_1-u_0}} \quad (9)$$

$$a_{i,j_0}^{(u_0)} = S_{i,j_0}^{(l-1)} \oplus a_{i,j_0}^{(u_1)}. \quad (10)$$

Update the syndromes $S^{(u_0)} \leftarrow S^{(u_0)} \oplus \beta^{2j_0} a_{i,j_0}^{(u_0)}$ and $S^{(u_1)} \leftarrow S^{(u_1)} \oplus \beta^{2j_0} a_{i,j_0}^{(u_1)}$. If no erasures remain, output the decoded AZs.

Step 6: If AZ u, where $0 \leq u \leq l-2$, comprises exactly 2 erasures in locations $a_{i,j_0}^{(u)}$ and $a_{i,j_1}^{(u)}$, where $0 \leq i \leq m-1$ and $0 \leq j_0 \leq j_1 \leq n-1$ and row i in AZ u' is erasure free, where $u' \notin \{u, l-1\}$, solve the system $$\beta^{j_0+u} a_{i,j_0}^{(u)} \oplus \beta^{j_1+u} a_{i,j_1}^{(u)} = S_i$$

$$\beta^{2j_0+u} a_{i,j_0}^{(u)} \oplus \beta^{2j_1} a_{i,j_1}^{(u)} = S^{(u)}.$$

Triangulate the system to obtain $$a_{i,j_0}^{(u)} \oplus \beta^{j_1-j_0} a_{i,j_1}^{(u)} = \beta^{-j_0-u} S_i$$

$$(1 \oplus \beta^{j_1-j_0}) a_{i,j_1}^{(u)} = \beta^{-j_1-u} S_i \oplus \beta^{-j_1-j_0} S^{(u)}.$$

Obtain $$a_{i,j_1}^{(u)} = \frac{\beta^{-j_1-u} S_i \oplus \beta^{-j_1-j_0} S^{(u)}}{1 \oplus \beta^{j_1-j_0}}$$

$$a_{i,j_0}^{(u)} = \beta^{-j_0-u} S_i \oplus \beta^{-j_1-j_0} a_{i,j_1}^{(u)}.$$

If no erasures remain, output the decoded AZs. If erasures remain, update the syndromes $S_{i,j_0}^{(2)} \leftarrow S_{i,j_0}^{(2)} \oplus a_{i,j_0}^{(u)}$ and $S_{i,j_1}^{(2)} \leftarrow S_{i,j_1}^{(2)} \oplus a_{i,j_1}^{(u)}$.

Step 7: If the number of remaining erasures is greater than four and s=1, the erasure pattern is declared uncorrectable. Otherwise, set s←1 and proceed to Step 2.

Step 8: If there are erasures in locations $a_{i,j_0}^{(u_0)}$ and $a_{i,j_1}^{(u_1)}$, where $0 \leq u_0 \leq u_1 \leq l-2$, $0 \leq i \leq m-1$ and $0 \leq j_0 < j_1 \leq n-1$, solve the system $$a_{i,j_0}^{(u_0)} \oplus a_{i,j_0}^{(u_1)} = S_{i,j_0}^{(l-1)}$$

$$a_{i,j_1}^{(u_0)} \oplus a_{i,j_1}^{(u_1)} = S_{i,j_1}^{(l-1)}$$

$$\beta^{j_0} a_{i,j_0}^{(u_0)} \oplus \beta^{j_1+u_0} a_{i,j_1}^{(u_0)} \oplus \beta^{j_0+u_1} a_{i,j_0}^{(u_1)} \oplus \beta^{j_1+u_1} a_{i,j_1}^{(u_1)} = S_i$$

$$\beta^{2j_0} a_{i,j_0}^{(u_1)} \oplus \beta^{2j_1} a_{i,j_1}^{(u_1)} = S^{(u_1)}.$$

Solve the system to obtain $$a_{i,j_1}^{(u_1)} = \frac{S_{i,j_1}^{(l-1)} \oplus \beta^{-(j_1-j_0)} S_{i,j_0}^{(l-1)} \oplus}{\beta^{-j_1-u_0} S_i \oplus \beta^{-(j_1-u_0)}(1 \oplus \beta^{u_1-u_0}) S^{(u_1)}} \quad (11)$$

$$a_{i,j_1}^{(u_1)} = \beta^{-2j_0} S^{(u_1)} \oplus \beta^{2(j_1-j_0)} a_{i,j_1}^{(u_1)} \quad (12)$$

$$a_{i,j_1}^{(u_0)} = S_{i,j_1}^{(l-1)} \oplus a_{i,j_1}^{(u_1)} \quad (13)$$

$$a_{i,j_0}^{(u_0)} = S_{i,j_0}^{(l-1)} \oplus a_{i,j_0}^{(u_1)}. \quad (14)$$

Output the corrected AZs.

Example 2

In one example, a code C(3, 3, 3; 8) for three 3×3 AZs over the finite field GF(8) may be used. Assume that β is a primitive element in GF(8) such that $1+\beta+\beta^3=0$. FIG. 14A is a table of data for decoding where xs correspond to the bits which are erased. In this example, the second AZ is completely erased. FIG. 14B is the output of writing the elements of FIG. 14A as powers of β. The elements to be computed by the algorithm are denoted by X.

Set s←0 and then compute the syndromes according to Step 1 to obtain the following, including $S^{(2)}$, where the last AZ has exactly one erasure)

$$S^{(0)} = (\beta^5 \oplus \beta^4 \beta^4) \oplus (\beta^2 \oplus \beta^4 \beta^3) \oplus (\beta^4) = \beta^4$$

$$S^{(1)} = 0$$

$$S^{(2)} = (\beta^4 \oplus \beta^2 \beta^4 \oplus \beta^4 \beta^6) \oplus (\beta \oplus \beta^2 \beta^4) \oplus (\beta^4 \oplus \beta^2 \beta^4) = \beta^2$$

$$S_0 = \beta^5 \oplus \beta^2 \beta^4 = \beta$$

$$S_1 = \beta^2 \oplus \beta^2 \beta^3 = \beta^3$$

$$S_2 = \beta^2$$

$$S_{0,0}^{(2)} = \beta^5 \oplus \beta^4 = 1$$

$$S_{0,1}^{(2)} = \beta^4$$

$$S_{0,2}^{(2)} = \beta^4 \oplus \beta^6 = \beta^3$$

$$S_{1,0}^{(2)} = \beta^2 \oplus \beta = \beta^4$$

$$S_{1,1}^{(2)} = \beta^4$$

$$S_{1,2}^{(2)} = \beta^3$$

$$S_{2,0}^{(2)} = \beta^4$$

$$S_{2,1}^{(2)} = \beta^4$$

$$S_{2,2}^{(2)} = 1.$$

In one approach, according to Step 2, there is only one AZ with exactly one erasure (e.g., in this example, the second AZ). According to (8), $$a_{1,2}^{(2)} = \beta^{-4}S^{(2)} = \beta^3\beta^2 = \beta^5.$$

Update the syndrome $$S_{1,2}^{(2)} \leftarrow S_{1,2}^{(2)} \oplus a_{1,2}^{(0)} = \beta^3 \oplus \beta^5 = \beta^2.$$

According to Step 3, for each i, for $0 \leq i \leq 2$, check the three vectors of length 6 $a_{i,j}^{(u)}$ such that $0 \leq u \leq 1$ and $0 \leq j \leq 2$ for erasures. In response to determining that none of the vectors comprise exactly one erasure, proceed to Step 4.

According to Step 4, for each i and j, for $0 \leq i \leq 2$ and $0 \leq j \leq 2$, check the three entries $a_{i,j}^{(u)}$ for $0 \leq u \leq 2$. For each occurrence of exactly one erasure, compute $$a_{0,0}^{(1)} = S_{0,0}^{(2)} = 1$$

$$S^{(1)} \leftarrow S^{(1)} \oplus a_{0,0}^{(1)} = 1$$

$$S_0 \leftarrow S_0 \oplus \beta a_{0,0}^{(1)} = \beta \oplus \beta = 0$$

$$a_{0,2}^{(1)} = S_{0,2}^{(1)} = \beta^3$$

$$S^{(1)} \leftarrow S^{(1)} \oplus \beta^4 a_{0,2}^{(1)} = 1 \oplus 1 = 0$$

$$S_0 \leftarrow S_0 \oplus \beta^3 a_{0,2}^{(1)} = \beta^6$$

$$a_{1,0}^{(1)} = S_{1,0}^{(2)} = \beta^4$$

$$S^{(1)} \leftarrow S^{(1)} \oplus a_{1,0}^{(1)} = \beta^4$$

$$S_1 \leftarrow S_1 \oplus \beta a_{1,0}^{(1)} = \beta^3 \oplus \beta^5 = \beta^2$$

$$a_{1,2}^{(1)} = S_{1,2}^{(2)} = \beta^2$$

$$S^{(1)} \leftarrow S^{(1)} \oplus \beta^4 a_{1,2}^{(1)} = \beta^4 \oplus \beta^6 = \beta^3$$

$$S_1 \leftarrow S_1 \oplus \beta^3 a_{0,2}^{(1)} = \beta^2 \oplus \beta^5 = \beta^3$$

$$a_{2,2}^{(1)} = S_{2,2}^{(2)} = 1$$

$$S^{(1)} \leftarrow S^{(1)} \beta^4 a_{2,2}^{(1)} = \beta^3 \oplus \beta^4 = \beta^6$$

$$S_2 \leftarrow S_2 \oplus \beta^3 a_{2,2}^{(1)} = \beta^2 \oplus \beta^3 = \beta^5.$$

According to Step 5, for each i, where $0 \leq i \leq 1$, find the erased entries $a_{i,1}^{(0)}$ and $a_{i,1}^{(2)}$. According to (9) and (10), where $$\frac{1}{(1 \oplus \beta)} = \beta^4,$$

$$a_{0,1}^{(1)} = \frac{s_{0,1}^{(2)} \oplus \beta^{-1}S_0}{1 \oplus \beta} = (\beta^4 + \beta^5)\beta^4 = \beta^4$$

$$S^{(1)} \leftarrow S^{(1)} \oplus \beta^2 a_{0,1}^{(1)} = \beta^6 \oplus \beta^6 = 0$$

$$a_{0,1}^{(0)} = S_{0,1}^{(2)} \oplus a_{0,1}^{(1)} = \beta^4 \oplus \beta^4 = 0$$

$$S^{(0)} \leftarrow S^{(0)} \oplus \beta^2 a_{0,1}^{(0)} = \beta^4$$

$$a_{1,1}^{(1)} = \frac{S_{1,1}^{(2)} \oplus \beta^{-1}S_1}{1 \oplus \beta} = (\beta^4 + \beta^2)\beta^4 = \beta^5$$

$$S^{(1)} \leftarrow S^{(1)} \oplus \beta^2 a_{1,1}^{(1)} = 1$$

$$a_{1,1}^{(0)} = S_{1,1}^{(2)} \oplus a_{1,1}^{(1)} = \beta^4 \oplus \beta^5 = 1$$

$$S^{(0)} \leftarrow S^{(0)} \oplus \beta^2 a_{1,1}^{(0)} = \beta^4 \oplus \beta^2 = \beta.$$

Step 6 does not apply where there are exactly 4 erasures in $a_{2,j}^{(u)}$, where $0 \leq u \leq 1$ and $0 \leq j \leq 1$. Proceed to Step 7 and Step 8 where there are less than or equal to 4 erasures and s=0. Apply (11), (12), (13), and (14), to obtain $$a_{2,1}^{(1)} = \frac{s_{2,1}^{(2)} \oplus \beta^{-1}s_{2,0}^{(2)} \oplus \beta^{-1}S_2 \oplus \beta^{-1}(1 \oplus \beta)S^{(1)}}{(1 \oplus \beta)(1 \oplus \beta)} = \beta(\beta^4 \oplus \beta^3 \oplus \beta^4 \oplus \beta^2) = \beta^6$$

$$a_{2,0}^{(1)} = S^{(1)} \oplus \beta^2 a_{1,1}^{(1)} = 1 \oplus \beta = \beta^3$$

$$a_{2,1}^{(0)} = S_{2,1}^{(2)} \oplus a_{2,1}^{(1)}; = \beta^4 \oplus \beta^6 = \beta^3$$

$$a_{2,0}^{(0)} = S_{2,0}^{(2)} \oplus a_{2,0}^{(1)}; = \beta^4 \oplus \beta^3 = \beta^6.$$

FIG. 14C is the output of the three decoded AZs which coincide with the three encoded AZs in Example 1.

Approach 2: Polynomials Modulo $1+x^p$ of Even Weight Description

In various approaches, denote the rotation of a vector of length p i times to the right by $\alpha^i$. For any integer l, denote by $<l>_p$ the unique integer m such that $0 \leq m \leq p-1$ and $m \equiv l \pmod{p}$. For clarity, $<l>_p$ may be denoted interchangeably herein as $<l>$.

The following lemma provides the recursion for the equation $(1 \oplus \alpha^j)\underline{z}(\alpha) = \underline{x}(\alpha)$, where both $\underline{z}(\alpha)$ and $\underline{x}(\alpha)$ are polynomials in $\alpha$ of even weight, $\alpha^p = 1$ and p is a prime number. In some approaches, $\underline{z}(\alpha)$ and $\underline{x}(\alpha)$ are vectors of length p of even weight, where $\underline{x}(\alpha)$ is given and $\underline{z}(\alpha)$ is obtained as a result of the recursion.

Lemma

Denote by $R_p^{(0)}$ the ideal of binary polynomials modulo $1+x^p$ of even weight, where p is a prime number. Let $\alpha^p = 1$, $\underline{x}(\alpha) = \oplus_{i=0}^{p-1} x_i \alpha^i \in R_p^{(0)}$ and $1 \leq j \leq p-1$. The recursion $(1 \oplus \alpha^j)\underline{z}(\alpha) = \underline{x}(\alpha)$ has a unique solution in $R_p^{(0)}$. Specifically, if $\underline{z}(\alpha) = \oplus_{i=0}^{p-1} z_i \alpha^i$, then $$z_0 = \bigoplus_{u=1}^{\frac{(p-1)}{2}} x_{\langle 2uj \rangle} \quad (15)$$

$$z_{\langle ij \rangle} = z_{\langle (i-1)j \rangle} \oplus x_{\langle ij \rangle} \text{ for } 1 \leq i \leq p-1. \quad (16)$$

For example, let p=7, $\underline{x}(\alpha) = 1 \oplus \alpha^3 \oplus \alpha^4 \oplus \alpha^6$, e.g., $x_0 = 1$, $x_1 = 0$, $x_2 = 0$, $x_3 = 1$, $x_4 = 1$, $x_5 = 0$ and $x_6 = 1$. Solve the recursion $(1 \oplus \alpha^3)\underline{z}(\alpha)\underline{z}(\alpha) = \underline{x}(\alpha)$. According to (15) and (16), $$z_0 = x_2 \oplus x_4 \oplus x_6 = 0$$

$$z_3 = z_0 \oplus x_3 = 1$$

$$z_6 = z_3 \oplus x_6 = 0$$

$$z_2 = z_6 \oplus x_2 = 0$$

$z_5 = z_2 \oplus x_5 = 0$ $z_1 = z_5 \oplus x_1 = 0$ $z_4 = z_1 \oplus x_4 = 1$, so $\underline{z}(\alpha) = \alpha^3 \oplus \alpha^4$.

The $(m(n+1)+l-1) \times (mnl)$ parity-check matrix for the code is similar to the parity-check matrix given by (1). Read the elements horizontally in each AZ, the first AZ sequentially followed by the second, etc. The parity-check matrix of the code is given by the $(m(n+1)+l-1) \times (mnl)$ matrix $$H(\ell, m, n; p) = \begin{pmatrix} (1\alpha \ldots \alpha^{\ell-2} 0) \otimes (I_m \otimes (1\alpha \ldots \alpha^{n-1})) \\ \hline (I_{\ell-1}, \underline{0}_{\ell-1}^T) \otimes (\underline{1}_m \otimes (1\alpha^2 \ldots \alpha^{2(n-1)})) \\ \hline \underline{1}_\ell \otimes I_{mn} \end{pmatrix}. \quad (17)$$

Denote the code given by the parity-check matrix H(l, m, n; p) defined by (17) as C(l, m, n; p). In a preferred embodiment, l=3, m=6, n=10, and p=257. According to (17), the code C(3, 6, 10; 257) is defined by the parity-check matrix given by $$H(3, 6, 10; 257) = \begin{pmatrix} (1\alpha 0) \otimes \\ (I_6 \otimes (1\alpha\alpha^2\alpha^3\alpha^4\alpha^5\alpha^6\alpha^7\alpha^8\alpha^9)) \\ \hline \begin{pmatrix} 1 & 0 & 0 \\ 0 & 1 & 0 \end{pmatrix} \otimes \\ (\underline{1}_6 \otimes (1\alpha^2\alpha^4\alpha^6\alpha^8\alpha^{10}\alpha^{12}\alpha^{14}\alpha^{16}\alpha^{18})) \\ \hline \underline{1}_3 \otimes I_{60} \end{pmatrix}. \quad (18)$$

The code C(l, m, n; p) has a minimum distance of 6.

The code may tolerate an erased AZ, together with an erased column and a random erased entry in a second AZ, and a random erasure in any of the remaining AZs.

In various approaches, denote entry (i, j) in AZ u, where $0 \leq i \leq m-1$, $0 \leq j \leq n-1$, and $0 \leq u \leq l-1$, by $a_{i,j}^{(u)}$. The parity blocks may be $a_{m-1,n-1}^{(u)}$ for $0 \leq u \leq l-3$, $a_{i,n-1}^{(l-2)}$ for $0 \leq i \leq m-1$, $a_{m-1,n-2}^{(l-2)}$ and $a_{i,j}^{(l-1)}$ for $0 \leq i \leq m-1$ and $0 \leq j \leq n-1$. In one approach, the entries are initially assumed to be zero.

Encoding Algorithm for C(l, m, n; p)

To encode the blocks $\hat{a}_{i,j}^{(u)}$ where $0 \leq u \leq l-3$, $0 \leq i \leq m-1$, $0 \leq j \leq n-1$ when $i \leq m-2$, $0 \leq j \leq n-2$ when $i=m-1$, and $\hat{a}_{i,j}^{(l-2)}$ where $0 \leq i \leq m-1$, $0 \leq j \leq n-2$ when $i \leq m-2$, $0 \leq j \leq n-3$ when $i=m-1$, into code C(l, m, n; p), where each $\hat{a}_{i,j}^{(u)}$ is a vector of length p-1, proceed as follows:

Step 1: Transform each entry $\hat{a}_{i,j}^{(u)}$ of length p-1 into an entry $a_{i,j}^{(u)}$ of length p by appending a parity bit that is the XOR of the p-1 bits of $\hat{a}_{i,j}^{(u)}$.

Step 2: Compute the following syndromes:

$$S^{(u)} = \bigoplus_{i=0}^{m-1} \bigoplus_{j=0}^{n-1} \alpha^{2j} a_{i,j}^{(u)} \text{ for } 0 \leq u \leq \ell - 2 \quad (19)$$

$$S_i = \bigoplus_{v=0}^{\ell-2} \bigoplus_{j=0}^{n-1} \alpha^{j+v} a_{i,j}^{(v)} \text{ for } 0 \leq i \leq m-1 \quad (20)$$

$$S_{i,j}^{(\ell-1)} = \bigoplus_{v=0}^{\ell-2} a_{i,j}^{(v)} \text{ for } 0 \leq i \leq m-1, 0 \leq j \leq n-1. \quad (21)$$

Step 3: Let $a_{m-1,n-1}^{(u)} = \alpha^{-2(n-1)} S^{(u)}$ for $0 \leq u \leq l-3$ and make $$S_{m-1} \leftarrow S_{m-1} \oplus \bigoplus_{u=0}^{\ell-3} \alpha^{u+n-1} a_{m-1,n-1}^{(u)}$$

$$S_{m-1,n-1}^{(\ell-1)} \leftarrow S_{m-1,n-1}^{(\ell-1)} \oplus \bigoplus_{u=0}^{\ell-3} a_{m-1,n-1}^{(u)}.$$

Step 4: Let $a_{i,n-1}^{(l-2)} = \alpha^{-(n+l-3)} S_i$ for $0 \leq i \leq m-2$ and make $$S^{(\ell-2)} \leftarrow S^{(\ell-2)} \oplus \alpha^{2(n-1)} \bigoplus_{i=0}^{m-2} a_{i,n-1}^{(\ell-2)}$$

$S_{i,n-1}^{(l-1)} \leftarrow S_{i,n-1}^{(l-1)} \oplus a_{i,n-1}^{(l-2)}$ for $0 \leq i \leq m-2$.

Step 5: Triangulate the system $\alpha^{n+l-4} a_{m-1,n-2}^{(l-2)} \oplus \alpha^{n+l-3} a_{m-1,n-1}^{(l-2)} = S_{m-1}$ $\alpha^{2(n-2)} a_{m-1,n-2}^{(l-2)} \oplus \alpha^{2(n-1)} a_{m-1,n-1}^{(l-2)} = S^{(l-2)}$.

The system becomes $a_{m-1,n-2}^{(l-2)} \oplus \alpha a_{m-1,n-1}^{(l-2)} = \alpha^{-(n+l-4)} S_{m-1}$ $a_{m-1,n-2}^{(l-2)} \oplus \alpha^2 a_{m-1,n-1}^{(l-2)} = \alpha^{-2(n-2)} S^{(l-2)}$ where $a_{m-1,n-2}^{(l-2)} \oplus \alpha a_{m-1,n-1}^{(l-2)} = \alpha^{-(n+l-4)} S_{m-1}$ $(1 \oplus \alpha) a_{m-1,n-1}^{(l-2)} = \alpha^{-(n+l-3)} S_{m-1} \oplus \alpha^{-2n+3} S^{(l-2)}$.

Obtain $a_{m-1,n-1}^{(l-2)}$ by applying the recursion given by (15) and (16).

Obtain $a_{m-1,n-2}^{(l-2)} = \alpha^{-(n+l-4)} S_{m-1} \oplus \alpha a_{m-1,n-1}^{(l-2)}$.

Update $S_{m-1,j}^{(l-1)} \leftarrow S_{m-1,j}^{(l-1)} \oplus a_{m-1,j}^{(l-2)}$ for $n-2 \leq j \leq n-1$.

Step 6: Let $a_{i,j}^{(l-1)} = S_{i,j}^{(l-1)}$ for $0 \leq i \leq m-1$, $0 \leq j \leq n-1$, to complete the encoding.

Example 3

Figures 15A, 15B, 15C:
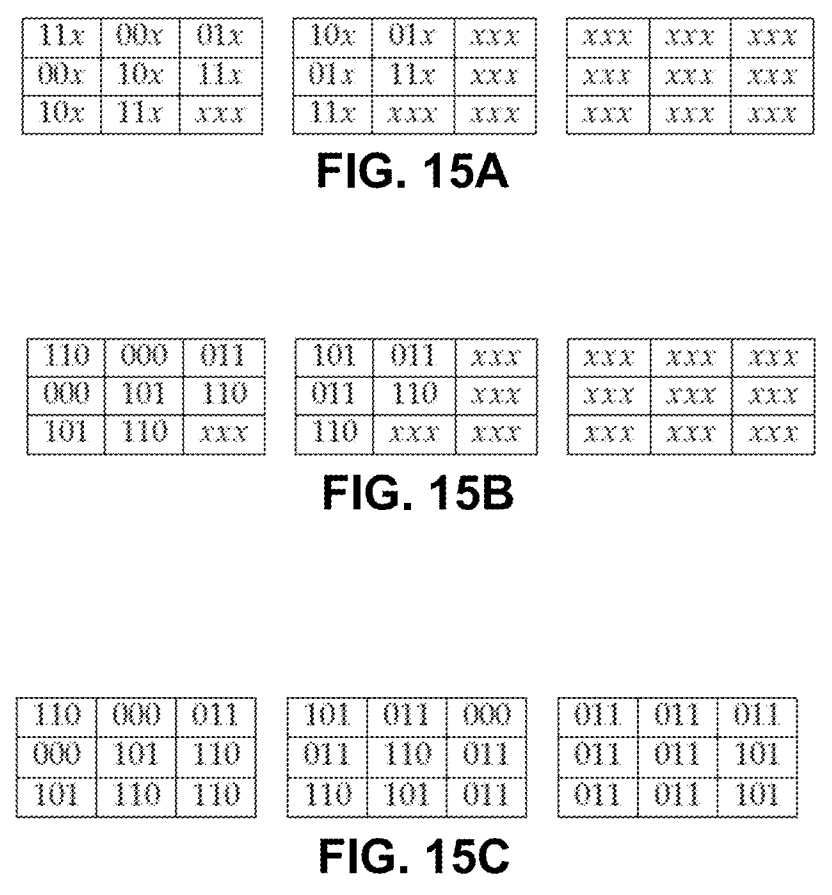

FIG. 15A is an example in C(3, 3, 3; 3) for three 3×3 AZs where the prime number is p=3. To encode the data in FIG. 15A, where the xs correspond to the bits to be computed by the encoding algorithm described above, compute the third bit in each entry comprising two bits in the first two AZs as described in the Step 1 of the encoding algorithm above.

FIG. 15B is the output of computing the third bit in each entry comprising two bits in the first two AZs.

The syndromes may be computed as described in the Step 2, where $\alpha^3 = 1$ and $\alpha^4 = \alpha$, to obtain:

$S^{(0)} = ((110) \oplus \alpha^2(000) \oplus \alpha^4(011)) \oplus ((000) \oplus \alpha^2(101) \oplus \alpha^4(110)) \oplus ((101) \oplus \alpha^2(110)) = (011)$ $S^{(1)} = ((101) \oplus \alpha^2(011)) \oplus ((011) \oplus \alpha^2(110)) \oplus (110) = (011)$ $S_0 = ((110) \oplus \alpha(000) \oplus \alpha^2(011)) \oplus (\alpha(101) \oplus \alpha^2(011)) = (000)$ $S_1 = ((000) \oplus \alpha(101) \oplus \alpha^2(110)) \oplus (\alpha(011) \oplus \alpha^2(110)) = (011)$ $S_2 = ((101) \oplus \alpha(110)) \oplus \alpha(110) = (101)$ $S_{0,0}^{(2)} = (110) \oplus (101) = (011)$ $S_{0,1}^{(2)} = (000) \oplus (011) = (011)$ $S_{0,2}^{(2)} = (011)$ $S_{1,0}^{(2)} = (000) \oplus (011) = (011)$ $S_{1,1}^{(2)} = (101) \oplus (110) = (011)$ $S_{1,2}^{(2)} = (110)$ $S_{2,0}^{(2)} = (101) \oplus (110) = (011)$ $S_{2,1}^{(2)} = (110)$ $S_{2,2}^{(2)} = (000).$ According to Step 3, obtain $a_{2,2}^{(0)} = \alpha^{-4} S^{(0)} = \alpha^2 (011) = (110)$ $S_2 = S_2 \oplus \alpha^2 (110) = (000)$ $S_{2,2}^{(2)} = S_{2,2}^{(2)} \oplus (110) = (110).$ According to Step 4, obtain $a_{0,2}^{(1)} = \alpha^{-3} S_0 = (000)$ $a_{1,2}^{(1)} = \alpha^{-3} S_1 = (011)$ $S^{(1)} = S^{(1)} \oplus \alpha^4 (a_{0,2}^{(1)} \oplus a_{1,2}^{(1)}) = (110)$ $S_{0,2}^{(2)} = S_{0,2}^{(2)} \oplus a_{0,2}^{(1)} = (011)$ $S_{1,2}^{(2)} = S_{1,2}^{(2)} \oplus a_{1,2}^{(1)} = (101).$ According to Step 5, solve the recursion $(1 \oplus \alpha) a_{2,2}^{(1)} = \alpha^{-3} S_2 \alpha^{-3} S^{(1)} = (000) \oplus (110) = (110).$ Solve the recursion using (15) and (16) to obtain $a_{2,2}^{(1)} = (011)$.
Then $a_{1,2}^{(1)} = \alpha a_{2,2}^{(1)} \oplus \alpha^{-2} S_2 = \alpha(011) \oplus \alpha(000) = (101).$
Update $S_{2,1}^{(2)} \leftarrow S_{2,1}^{(2)} \oplus a_{2,1}^{(1)} = (110) \oplus (101) = (011)$ $S_{2,2}^{(2)} \leftarrow S_{2,2}^{(2)} \oplus a_{2,2}^{(1)} = (110) \oplus (101) = (011).$ According to Step 6, make $a_{i,j}^{(2)} = S_{i,j}^{(2)}$ for $0 \leq i \leq 2$, $0 \leq j \leq 2$.

FIG. 15C gives the final encoded three AZs according to the encoding algorithm disclosed above.

Decoding Algorithm for C(l, m, n; p)

Assume that the input $\hat{a}_{i,j}^{(u)}$ for $0 \leq u \leq l-1$, $0 \leq i \leq m-1$, and $0 \leq j \leq n-1$ is received where the input corresponds to a codeword $a_{i,j}^{(u)}$ in the code C(l, m, n; p) which may comprise erasures. If no erasures exist (e.g., $\hat{a}_{i,j}^{(u)} = a_{i,j}^{(u)}$ for all values), then the output coincides with the input. If erasures exist, proceed as follows:

Step 1: For each block $\hat{a}_{i,j}^{(u)}$, if such a block has exactly one erasure, then recover the erasure by XORing the remaining p-1 bits in the block. If there are at least two erasures, the whole block may be declared erased and the value of the block may be set equal to zero. Denote the new blocks by $a_{i,j}^{(u)}$. If no erasures remain, output the AZs. If erasures remain, set $s \leftarrow 0$.

Step 2: Compute the syndromes $S^{(u)}$ for $0 \leq u \leq l-2$ according to (19), $S_i$ for $0 \leq i \leq m-1$ according to (20), and $S_{i,j}^{(l-1)}$ for $0 \leq i \leq m-1$ and $0 \leq j \leq n-1$ according to (21). If the last AZ contains exactly one erasure, compute $$S^{(l-1)} = \bigoplus_{i=0}^{m-1} \bigoplus_{j=0}^{n-1} \alpha^{2j} a_{i,j}^{(l-1)}. \tag{22}$$

Step 3: For each u, where $0 \leq u \leq l-1$, if AZ u has only one erasure in block $a_{i,j}^{(u)}$, where $0 \leq i \leq m-1$ and $0 \leq j \leq n-1$, compute $a_{i,j}^{(u)} = \alpha^{-2j} S^{(u)}$.

If no erasures remain, output the decoded AZs. If erasures remain, update the syndromes $S_i \leftarrow S_i \oplus \alpha^{j+u} a_{i,j}^{(u)}$ if $0 \leq u \leq l-2$ and $S_{i,j}^{(l-1)} \leftarrow S_{i,j}^{(l-1)} \oplus a_{i,j}^{(u)}$ for each AZ u that has been corrected.

Step 4: For each i, where $0 \leq i \leq m-1$, consider locations $a_{i,j}^{(u)}$ such that $0 \leq u \leq l-1$ and $0 \leq j \leq n-1$. If there is exactly one erasure, for example, in location $a_{i,j_0}^{(v)}$, then compute $a_{i,j_0}^{(v)} = \alpha^{-j_0-v} S_i$ and update the syndromes $S^{(v)} \leftarrow S^{(v)} \oplus \alpha^{2j_0} a_{i,j_0}^{(v)}$ and $S_{i,j_0}^{(l-1)} = S_{i,j_0}^{(l-1)} \oplus a_{i,j_0}^{(v)}$. If no erasures remain, output the decoded AZs.

Step 5: For each i and j where $0 \leq i \leq m-1$ and $0 \leq j \leq n-1$, consider the l entries $a_{i,j}^{(u)}$ for $0 \leq u \leq l-1$. If there is exactly one erasure in these 3 entries, for example, in entry $a_{i,j}^{(u_0)}$, compute $a_{i,j}^{(u_0)} = S_{i,j}^{(l-1)}$ and update the syndromes $S^{(u_0)} \leftarrow S^{(u_0)} \oplus \alpha^{2j} a_{i,j}^{(u_0)}$ if $u_0 < l-1$, $S_i \leftarrow S_i \oplus \alpha^{j+u_0} a_{i,j}^{(u_0)}$. If no erasures remain, output the decoded AZs.

Step 6: For each i, where $0 \leq i \leq m-1$, consider locations $a_{i,j}^{(u)}$ such that $0 \leq u \leq l-2$ and $0 \leq j \leq n-1$. If there are exactly two erasures in locations $a_{i,j_0}^{(u_0)}$ and $a_{i,j_0}^{(u_1)}$ where $0 \leq u_0 < u_1 \leq l-2$ and the remaining locations $a_{i,j}^{(u)}$ are erasure free, solve the system $a_{i,j_0}^{(u_0)} \oplus a_{i,j_0}^{(u_1)} = S_{i,j_0}^{(l-1)}$ $\alpha^{j_0+u_0} a_{i,j_0}^{(u_0)} \oplus \alpha^{j_0+u_1} a_{i,j_0}^{(u_1)} = S_i.$ Triangulate the system to obtain $$(1 \oplus \alpha^{u_1-u_0}) a_{i,j_0}^{(u_1)} = S_{i,j_0}^{(l-1)} \oplus \alpha^{-j_0-u_0} S_i \tag{23}$$

$$a_{i,j_0}^{(u_0)} = S_{i,j_0}^{(l-1)} \oplus a_{i,j_0}^{(u_1)}. \tag{24}$$

Obtain $a_{i,j_0}^{(u_1)}$ by applying the recursion given by (15) and (16) to equation (23). Obtain $a_{i,j_0}^{(u_0)}$ by equation (24). If no erasures remain, output the decoded AZs. If erasures remain, update the syndromes $S^{(u_0)} \leftarrow S^{(u_0)} \oplus \alpha^{2j_0} a_{i,j_0}^{(u_0)}$ and $S^{(u_1)} \leftarrow S^{(u_1)} \oplus \alpha^{2j_0} a_{i,j_0}^{(u_1)}$.

Step 7: If AZ u, where $0 \leq u \leq l-2$, has exactly 2 erasures in locations $a_{i,j_0}^{(u)}$ and $a_{i,j_1}^{(u)}$, where $0 \leq i \leq m-1$ and $0 \leq j_0 \leq j_1 \leq n-1$ and row i in AZ u' is erasure free, where $u' \notin \{u, l-1\}$, solve the system $\alpha^{j_0+u} a_{i,j_0}^{(u)} \oplus \alpha^{j_1+u} a_{i,j_1}^{(u)} = S_i$ $\alpha^{2j_0} a_{i,j_0}^{(u)} \oplus \alpha^{2j_1} a_{i,j_1}^{(u)} = S^{(u)}.$ Triangulate the system to obtain $$(1 \oplus \alpha^{j_1-j_0}) a_{i,j_1}^{(u)} = \alpha^{-j_1-u} S_i \oplus \alpha^{-j_1-j_0} S^{(u)} \tag{25}$$

$$a_{i,j_0}^{(u)} = \alpha^{-j_0-u} S_i \oplus \alpha^{-j_1-j_0} a_{i,j_1}^{(u)}. \tag{26}$$

Obtain $a_{i,j_1}^{(u)}$ by applying the recursion given by (15) and (16) to equation (25). Obtain $a_{i,j_0}^{(u)}$ by equation (26). If no erasures remain, output the decoded AZs. If erasures remain, update the syndromes $S_{i,j_0}^{(l-1)} \leftarrow S_{i,j_0}^{(l-1)} \oplus a_{i,j_0}^{(u)}$ and $S_{i,j_1}^{(l-1)} \leftarrow S_{i,j_1}^{(l-1)} \oplus a_{i,j_1}^{(u)}$.

Step 8: If the number of remaining erasures is greater than four and s=1, the erasure pattern is declared uncorrectable. Otherwise set $s \leftarrow 1$ and proceed to Step 3.

Step 9: If there are erasures in locations $a_{i,j_0}^{(u_0)}$ and $a_{i,j_1}^{(u_1)}$, where $0 \leq u_0 < u_1 \leq l-2$, $0 \leq i \leq m-1$ and $0 \leq j_0 < j_1 \leq n-1$, solve the system $a_{i,j_0}^{(u_0)} \oplus a_{i,j_0}^{(u_1)} = S_{i,j_0}^{(l-1)}$ $a_{i,j_1}^{(u_0)} \oplus a_{i,j_1}^{(u_1)} = S_{i,j_1}^{(l-1)}$ $$\alpha^{j0+u0}a_{i,j_0}^{(u0)} \oplus \alpha^{j1+u0}a_{i,j_1}^{(u0)} \oplus \alpha^{j1+u1}a_{i,j_0}^{(u1)} \oplus \alpha^{j1+u1}a_{i,j_1}^{(u1)} = S_i$$

$$\alpha^{2j0}a_{i,j_0}^{(u1)} \oplus \alpha^{2j1}a_{i,j_1}^{(u1)} = S^{(u1)}.$$

Triangulate the system to obtain $$(1 \oplus \beta^{u1-u0})(1 \oplus \beta^{j1-j0})a_{i,j_1}^{(u1)} = S_{i,j_1}^{(l-1)} \oplus \beta^{-(j1-j0)}S_{i,j_0}^{(l-1)} \\ \oplus \beta^{-j1-j0}S_i \oplus \beta^{-(j1-j0)}(1 \oplus \beta^{u1-u0})S^{(u1)} \quad (27)$$

$$a_{i,j_0}^{(u1)} = \beta^{-2j0}S^{(u1)} \oplus \beta^{2(j1-j0)}a_{i,j_1}^{(u1)} \quad (28)$$

$$a_{i,j_1}^{(u0)} = S_{i,j_1}^{(l-1)} \oplus a_{i,j_1}^{(u1)} \quad (29)$$

$$a_{i,j_0}^{(u0)} = S_{i,j_0}^{(l-1)} \oplus a_{i,j_0}^{(u1)}. \quad (30)$$

Obtain $a_{i,j_1}^{(u1)}$ by applying the recursion given by (15) and (16) twice to the equation (27). Obtain the remaining erasures from (28), (29), and (30). Output the corrected AZs.

Example 4

FIG. 16A is an example in C(3, 3, 3; 3). To decode the data in the three AZs in FIG. 16A, where the xs correspond to the erased bits to be computed by the decoding algorithm described above, recover the bits in each 3-bit block with only one erasure by XORing the remaining two blocks and set s←0. FIG. 16B is the output of XORing the remaining two blocks.

Assume that the erased blocks are 0. According to Step 2, compute the syndromes according to (19), (20), and (21), where $\alpha^4 = \alpha$.

$$S^0 = (110) \oplus \alpha(011) \oplus \alpha(110) \oplus (101) \oplus \alpha(110) = (110)$$

$$S^{(1)} = (110) \oplus (011) \oplus \alpha^2(110) \oplus \alpha(011) \oplus (101) \oplus \alpha^2(101) \\ \oplus \alpha(011) = (110)$$

$$S_0 = (110) \oplus \alpha^2(011) \oplus \alpha(101) = (110)$$

$$S_1 = \alpha^2(110) \oplus \alpha(011) \oplus \alpha^2(110) \oplus \alpha^3(011) = (110)$$

$$S_2 = (101)\alpha^2(110) \oplus \alpha(110) \oplus \alpha^2(101) \oplus \alpha^3(011) = (011)$$

$$S_{0,0}^{(2)} = (110) \oplus (101) = (011)$$

$$S_{0,1}^{(2)} = (000)$$

$$S_{0,2}^{(2)} = (011)$$

$$S_{1,0}^{(2)} = (011)$$

$$S_{1,1}^{(2)} = (110)$$

$$S_{1,2}^{(2)} = (110) \oplus (011) = (101)$$

$$S_{2,0}^{(2)} = (101) \oplus (110) = (011)$$

$$S_{2,1}^{(2)} = (101)$$

$$S_{2,2}^{(2)} = (110) \oplus (011) = (101).$$

According to Step 3, where there is only one AZ with exactly one erasure (e.g., AZ 1), compute $$a_{0,1}^{(1)} = \alpha^{-2}S^{(1)} = \alpha(110) = (011)$$

$$S_0 \leftarrow S_0 \oplus \alpha^2 a_{0,1}^{(1)} = (110) \oplus \alpha^2(011) = (000)$$

$$S_{0,1}^{(2)} \leftarrow S_{0,1}^{(2)} \oplus a_{0,1}^{(1)} = (011).$$

According to Step 4, compute $$a_{0,1}^{(0)} = \alpha^{-1}S_0 = (000)$$

$$S^{(0)} \leftarrow S^{(0)} \oplus \alpha^2 a_{0,1}^{(0)} = (110)$$

$$S_{0,1}^{(2)} \leftarrow S_{0,1}^{(2)} \oplus a_{0,1}^{(0)} = (011)$$

$$a_{2,1}^{(0)} = \alpha^{-1}S_2 = \alpha^2(011) = (110)$$

$$S^{(0)} \leftarrow S^{(0)} \oplus \alpha^2 a_{2,1}^{(0)} = (011)$$

$$S_{2,1}^{(2)} \leftarrow S_{2,1}^{(2)} \oplus a_{2,1}^{(0)} = (101) \oplus (110) = (011).$$

According to Step 5, compute $$a_{0,0}^{(2)} = S_{0,0}^{(2)} = (011)$$

$$a_{0,1}^{(2)} = S_{0,1}^{(2)} = (011)$$

$$a_{0,2}^{(2)} = S_{0,2}^{(2)} = (011)$$

$$a_{1,2}^{(2)} = S_{1,2}^{(2)} = (101)$$

$$a_{2,0}^{(2)} = S_{2,0}^{(2)} = (011)$$

$$a_{2,1}^{(2)} = S_{2,1}^{(2)} = (011)$$

$$a_{2,2}^{(2)} = S_{2,2}^{(2)} = (101).$$

Step 6 does not apply where there is no row i with two erased blocks $a_{i,j}^{(0)}$ and $a_{i,j}^{(1)}$. Proceed to Step 7 where AZ 0 has exactly 2 erasures in blocks $a_{1,0}^{(0)}$ and $a_{1,1}^{(0)}$ and AZ 1 is erasure free. Using equation (25), solve $$(1 \oplus \alpha)a_{1,1}^{(0)} = \alpha^{-1}S_1 \oplus \alpha^{-1}S^{(0)} = \alpha^2(110) \oplus \alpha^2(011) = (011).$$

Solve the system using the recursion given by (15) and (16). Obtain $a_{1,1}^{(0)} = (101)$. According to equation (26), $a_{1,0}^{(0)} = S_1 \oplus \alpha a_{1,1}^{(0)} = (110) \oplus \alpha(101) = (000)$.

Since erasures remain, update the syndromes $S_{1,0}^{(2)} \leftarrow S_{1,0}^{(2)} \oplus a_{1,0}^{(0)} = (011)$ and $S_{1,1}^{(2)} \leftarrow S_{1,1}^{(2)} \oplus a_{1,1}^{(0)} = (110) \oplus (101) = (011)$.

According to Step 8, since the number of erasures is not larger than four, set s←1 and proceed to Step 3. Steps 3 and 4 do not apply in this configuration. According to Step 5, compute $a_{1,0}^{(2)} = S_{1,0}^{(2)} = (011)$ and $a_{1,1}^{(2)} = S_{1,1}^{(2)} = (011)$.

FIG. 16C is the final decoded three AZs according to the decoding algorithm disclosed above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method to enable reconstructing contents of blocks in a storage system having l availability zones (AZs), a set of n storage units in each AZ arranged as columns, a set of m storage blocks in each storage unit, wherein the storage blocks of n+1 of the storage units are parity blocks, wherein l−1 of the AZs each include an additional parity block, the method comprising:

using the parity blocks and/or data in the AZs, reconstructing contents of blocks in the storage system having l availability zones (AZs) from a concurrent loss of: one of the AZs, a storage unit together with one storage block in one of the remaining l−1 AZs, and one further storage block in each of the l−2 remaining AZs of the storage system, wherein the further storage block in each of the l−2 remaining AZs of the storage system is reconstructed within each of the corresponding AZs without invoking the other AZ(s) of the l−1 AZs.

2. The computer-implemented method of claim 1, wherein n of the parity blocks are in one AZ, wherein the contents of all the blocks in the storage system are reconstructed in response to the concurrent loss of one AZ, one storage unit together with one storage block in one of the remaining l−1 AZs and one storage block in each of the l−2 remaining AZs.

3. The computer-implemented method of claim 2, wherein each storage block comprises an element in a finite field $GF(2^b)$.

4. The computer-implemented method of claim 2, wherein each storage block comprises p sectors, wherein p−1 sectors contain data and the remaining sector contains parity.

5. The computer-implemented method of claim 4, wherein the number of sectors p is a prime number.

6. The computer-implemented method of claim 1, comprising encoding storage blocks of data in the storage system.

7. The computer-implemented method of claim 1, wherein $l \geq 3$.

8. A computer program product to enable reconstructing contents of blocks in a storage system having l availability zones (AZs), a set of n storage units in each AZ arranged as columns, a set of m storage blocks in each storage unit, wherein the storage blocks of n+1 of the storage units are parity blocks, wherein l−1 of the AZs each include an additional parity block, the computer program product comprising a computer readable storage medium having program instructions embodied therewith, the program instructions executable by a computer to cause the computer to:

using the parity blocks and/or data in the AZs, reconstruct, by the computer, contents of blocks in the storage system having l availability zones (AZs) from a concurrent loss of: one of the AZs, a storage unit together with one storage block in one of the remaining l−1 AZs, and one further storage block in each of the remaining l−2 AZs of the storage system, wherein the further storage block in each of the remaining l−2 AZs of the storage system is reconstructed within each of the corresponding AZs without invoking the other AZ(s) of the l−1 AZs.

9. The computer program product of claim 8, wherein n of the parity blocks are in one AZ, wherein the contents of all the blocks in the storage system are reconstructed in response to the concurrent loss of one AZ, one storage unit together with one storage block in one of the remaining l−1 AZs and one storage block in each of the remaining l−2 AZs.

10. The computer program product of claim 9, wherein each storage block comprises an element in a finite field $GF(2^b)$.

11. The computer program product of claim 9, wherein each storage block comprises p sectors, wherein p−1 sectors contain data and the remaining sector contains parity.

12. The computer program product of claim 11, wherein the number of sectors p is a prime number.

13. The computer program product of claim 8, comprising program instructions to cause the computer to:
encode, by the computer, storage blocks of data in the storage system.

14. The computer program product of claim 8, wherein $l \geq 3$.

15. A system, comprising:
a processor; and
logic to enable reconstructing contents of blocks in a storage system having l availability zones (AZs), a set of n storage units in each AZ arranged as columns, a set of m storage blocks in each storage unit, wherein the storage blocks of n+1 of the storage units are parity blocks, wherein l−1 of the AZs each include an additional parity block, the logic being integrated with the processor, executable by the processor, or integrated with and executable by the processor, the logic being configured to:

using the parity blocks and/or data in the AZs, reconstruct contents of blocks in the storage system having l availability zones (AZs) from a concurrent loss of: one of the AZs, a storage unit together with one storage block in one of the remaining l−1 AZs, and one further storage block in each of the remaining l−2 AZs of the storage system, wherein the further storage block in each of the remaining l−2 AZs of the storage system is reconstructed within each of the corresponding AZs without invoking the other AZ(s) of the l−1 AZs.

16. The system of claim 15, wherein n of the parity blocks are in one AZ, wherein the contents of all the blocks in the storage system are reconstructed in response to the concurrent loss of one AZ, one storage unit together with one storage block in one of the remaining l−1 AZs and one storage block in each of the remaining l−2 AZs.

17. The system of claim 16, wherein each storage block comprises an element in a finite field $GF(2^b)$.

18. The system of claim 16, wherein each storage block comprises p sectors, wherein p−1 sectors contain data and the remaining sector contains parity.

19. The system of claim 18, wherein the number of sectors p is a prime number.

20. The system of claim 15, comprising logic configured to:
encode storage blocks of data in the storage system.

* * * * *